(12) United States Patent
Wong

(10) Patent No.: US 10,843,550 B2
(45) Date of Patent: Nov. 24, 2020

(54) THERMAL MANAGEMENT SYSTEM WITH TWO PUMPS AND THREE LOOPS

(71) Applicant: NIO USA, Inc., San Jose, CA (US)

(72) Inventor: Ming Fung Wong, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 139 days.

(21) Appl. No.: 16/107,885

(22) Filed: Aug. 21, 2018

(65) Prior Publication Data

US 2020/0062106 A1 Feb. 27, 2020

(51) Int. Cl.
*B60R 11/02* (2006.01)
*B60K 11/02* (2006.01)
*B60K 1/00* (2006.01)
*B60L 58/26* (2019.01)

(52) U.S. Cl.
CPC .............. *B60K 11/02* (2013.01); *B60K 1/00* (2013.01); *B60L 58/26* (2019.02); *B60K 2001/005* (2013.01); *B60K 2001/006* (2013.01); *B60K 2001/008* (2013.01)

(58) Field of Classification Search
CPC .... B60K 11/02; B60K 1/00; B60K 2001/005; B60K 2001/006; B60K 2001/008; B60L 58/26
USPC ...................................................... 180/65.1
See application file for complete search history.

(56) References Cited

U.S. PATENT DOCUMENTS

| | | |
|---|---|---|
| 2,670,933 A | 3/1954 | Bay |
| 3,863,612 A | 2/1975 | Wiener |
| 5,701,852 A | 12/1997 | Suzuki et al. |
| 5,950,576 A | 9/1999 | Busato et al. |
| 6,048,179 A | 4/2000 | Forster |
| 6,098,576 A | 8/2000 | Nowak, Jr. et al. |
| 6,196,167 B1 | 3/2001 | Marsh et al. |
| 8,336,319 B2 | 12/2012 | Johnston et al. |
| 8,347,831 B2 | 1/2013 | Vacca et al. |
| 9,511,645 B2 | 12/2016 | Johnston |
| 9,522,609 B2 | 12/2016 | Lee et al. |
| 9,533,546 B2 | 1/2017 | Cheng |
| 9,533,547 B2 | 1/2017 | Cheng |
| 9,533,551 B2 | 1/2017 | Cheng |
| 9,539,877 B2 | 1/2017 | Cheng |
| 2003/0079728 A1 | 5/2003 | Marsh et al. |
| 2004/0187805 A1 | 9/2004 | Arisawa et al. |
| 2004/0237912 A1 | 12/2004 | Pawellek et al. |
| 2005/0000473 A1 | 1/2005 | Ap et al. |

(Continued)

OTHER PUBLICATIONS

U.S. Appl. No. 15/802,651, filed Nov. 3, 2017, Wong.

(Continued)

*Primary Examiner* — Paul N Dickson
*Assistant Examiner* — Hilary L Johns
(74) *Attorney, Agent, or Firm* — Sheridan Ross P.C.

(57) ABSTRACT

A thermal management system comprises two pumps and three coolant loops. The loops are interconnectable such that most if not all of the functions of the thermal management system can be accomplished with one of the two pumps deactivated or inoperable. The thermal management system is selectively configurable to utilize waste heat from a battery, an electrical drivetrain system, and/or a wireless charger to heat cabin air. The thermal management system is further selectively configurable to heat or cool a battery, to cool an electrical drivetrain system, and to cool a wireless charger.

20 Claims, 19 Drawing Sheets

(56) References Cited

U.S. PATENT DOCUMENTS

| | | | |
|---|---|---|---|
| 2012/0183815 A1* | 7/2012 | Johnston | B60L 58/27 |
| | | | 429/50 |
| 2013/0305708 A1 | 11/2013 | Zandeh et al. | |
| 2014/0103128 A1 | 4/2014 | Patel et al. | |
| 2016/0101666 A1 | 4/2016 | Sugimura et al. | |
| 2016/0107503 A1* | 4/2016 | Johnston | B60H 1/32284 |
| | | | 165/202 |
| 2016/0215678 A1 | 7/2016 | Fedewa | |
| 2016/0341100 A1 | 11/2016 | Nagai et al. | |
| 2018/0100711 A1 | 4/2018 | Bonkoski et al. | |
| 2018/0264913 A1 | 9/2018 | Enomoto et al. | |
| 2019/0176572 A1* | 6/2019 | Kim | B60H 1/00921 |

OTHER PUBLICATIONS

U.S. Appl. No. 15/909,281, filed Mar. 1, 2018, Abrego et al.
Official Action for U.S. Appl. No. 15/909,281, dated Nov. 18, 2019 14 pages.
Final Action for U.S. Appl. No. 15/909,281, dated Jun. 19, 2020 13 pages.

* cited by examiner

THERMAL MANAGEMENT SYSTEM WITH TWO PUMPS AND THREE LOOPS

FIELD

The present disclosure is generally directed toward vehicle thermal management systems, and more particularly, toward thermal management systems for electric and/or hybrid-electric vehicles.

BACKGROUND

Unlike internal combustion engine vehicles, the range of electric vehicles is very sensitive to thermal and electrical usage for auxiliary systems and cabin comfort. Previous attempts to address this issue have generally failed to harvest system waste heat and reuse the system waste heat for cabin comfort. U.S. Pat. No. 8,336,319, entitled "Thermal management system with dual mode coolant loops," describes a cooling loop that does not provide a cabin comfort function. U.S. Pat. Nos. 9,533,546 and 9,533,547, each entitled "Electric vehicle thermal management system," each describe a cooling loop that uses dual radiators. U.S. Pat. Nos. 9,533,551 and 9,539,877, each entitled "Electric vehicle thermal management system with series and parallel structure," also each describe a cooling loop that uses dual radiators. U.S. Pat. No. 9,511,645, entitled "EV multi-mode thermal management system," describes a cabin comfort loop that requires pre-heating the coolant inside the loop using both a heat pump system and an electric heater before the loop can be used for heating the cabin. U.S. Patent Application Publication No. 2014/0103128, entitled "Thermostatically-controlled multi-mode coolant loops," describes a heat transfer system with primary and auxiliary loops. U.S. Patent Application Publication No. 2016/0101666, entitled "Vehicular heat management system," describes a heat management system in which first and second heat medium circuits may be coupled or uncoupled. U.S. patent application Ser. No. 15/802,651, entitled "Four-Way Hydraulic Valve Flow Control Body," describes a novel four-way valve that may be used, for example, in thermal management systems. Each of the foregoing references is hereby incorporated by reference herein in its entirety.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
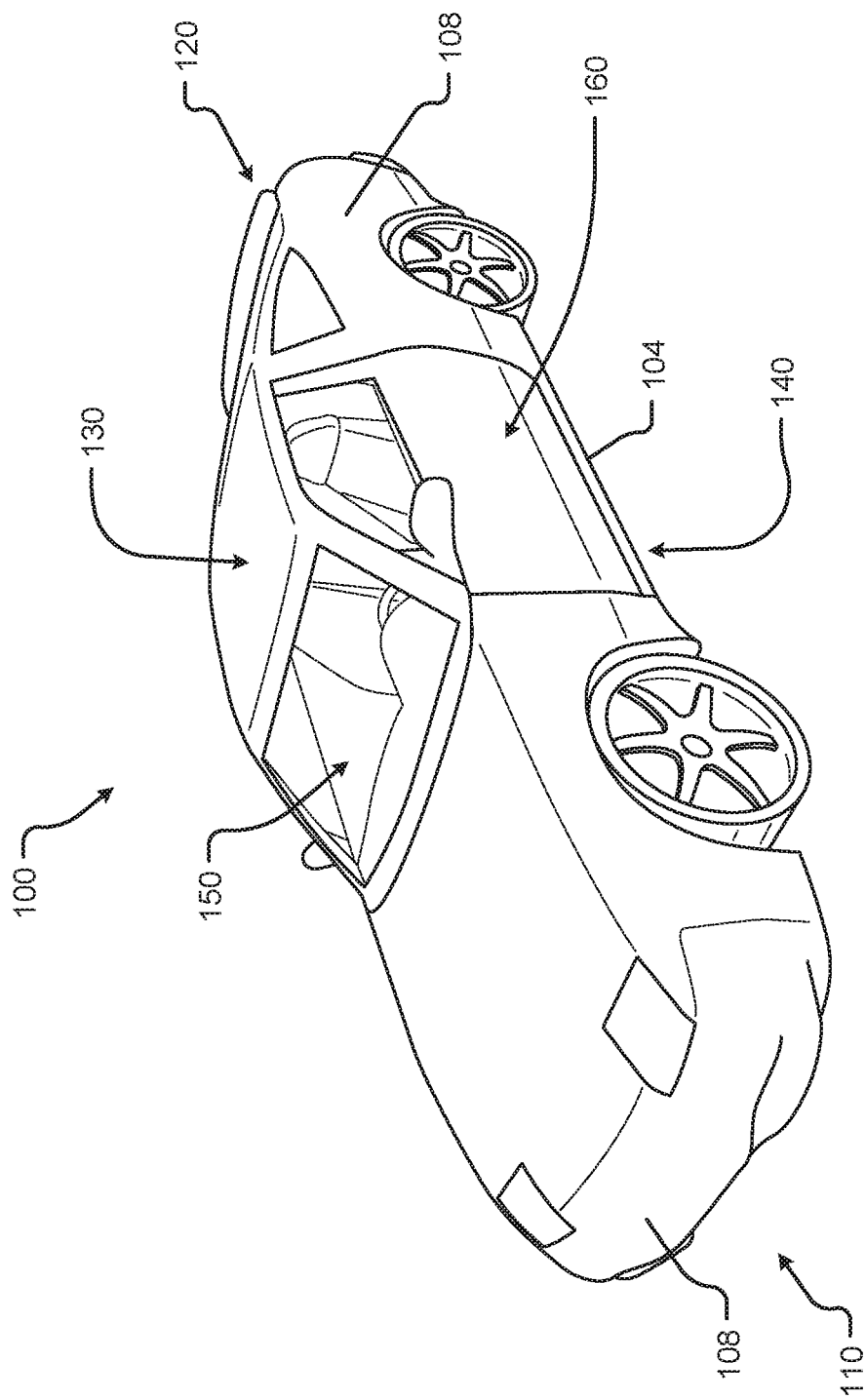
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft 120, vehicle roof 130, at least one vehicle side 160, a vehicle undercarriage 140, and a vehicle interior or cabin 150. In any event, the vehicle 100 may include a frame 104 and one or more body panels 108 mounted or affixed thereto. The vehicle 100 may include one or more interior components (e.g., components inside an interior space or cabin 150, or user space, of a vehicle 100, etc.), exterior components (e.g., components outside of the interior space or cabin 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

Figure 2:
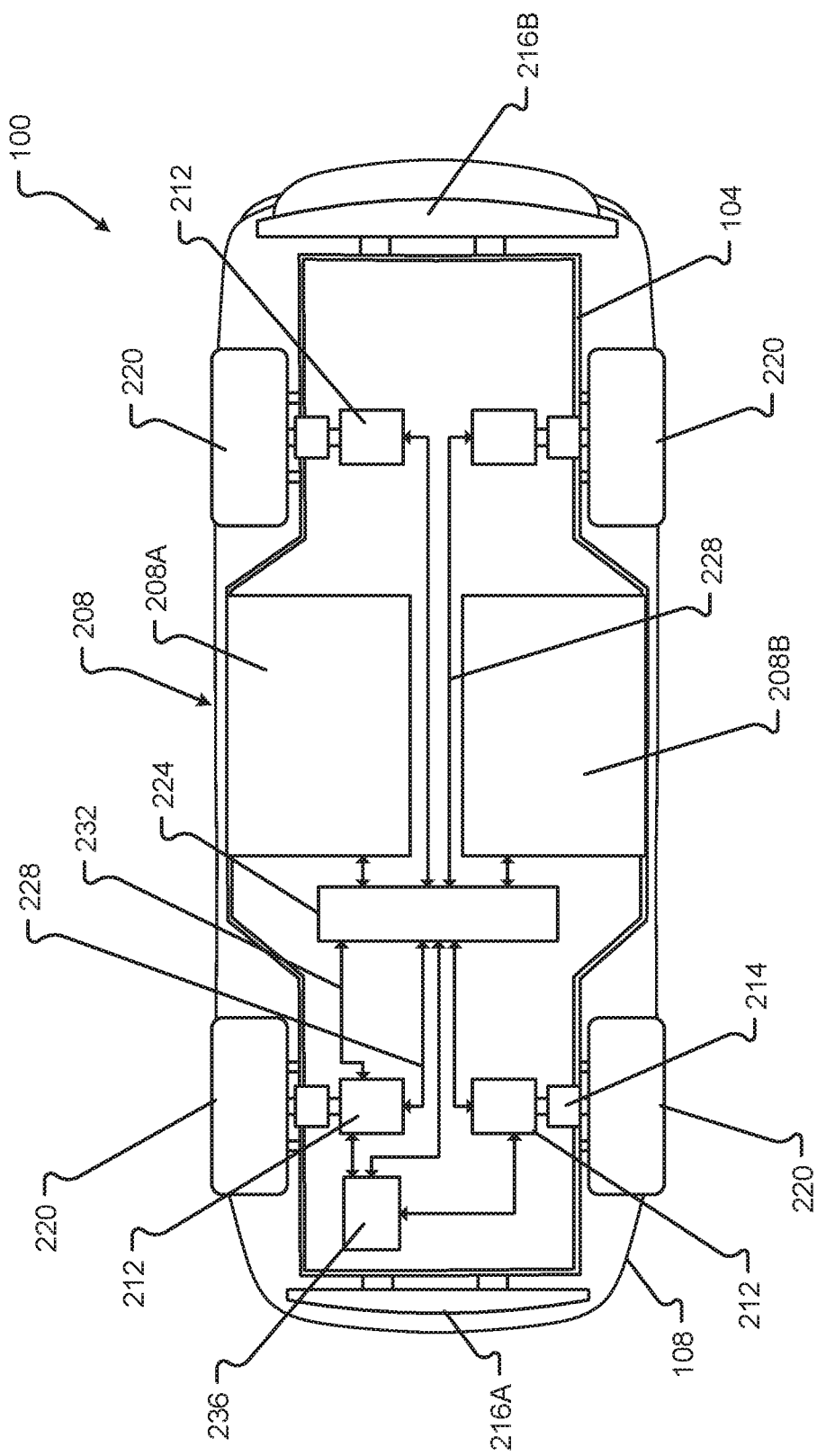
FIG. 2 shows a bottom plan view of the vehicle in accordance with at least some embodiments of the present disclosure.

Referring now to FIG. 2, a plan view of a vehicle 100 will be described in accordance with embodiments of the present disclosure. As provided above, the vehicle 100 may comprise a number of electrical and/or mechanical systems, subsystems, etc. The mechanical systems of the vehicle 100 can include structural, power, safety, and communications subsystems, to name a few. While each subsystem may be described separately, it should be appreciated that the components of a particular subsystem may be shared between one or more other subsystems of the vehicle 100.

The structural subsystem includes the frame 104 of the vehicle 100. The frame 104 may comprise a separate frame and body construction (i.e., body-on-frame construction), a unitary frame and body construction (i.e., a unibody construction), or any other construction defining the structure of the vehicle 100. The frame 104 may be made from one or more materials including, but in no way limited to steel, titanium, aluminum, carbon fiber, plastic, polymers, etc., and/or combinations thereof. In some embodiments, the frame 104 may be, for example, formed, welded, fused, fastened, pressed, combinations thereof, or otherwise shaped to define a physical structure and strength of the vehicle 100. In any event, the frame 104 may comprise one or more surfaces, connections, protrusions, cavities, mounting points, tabs, slots, or other features that are configured to receive other components that make up the vehicle 100. For example, the body panels 108, powertrain subsystem, controls systems, interior components, communications subsystem, and safety subsystem may interconnect with, or attach to, the frame 104 of the vehicle 100.

The frame 104 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allows the vehicle 100 to adapt to the ever-changing technological demands of society and advances in safety. Among other things, the mechanisms may provide for the quick exchange of, for example, batteries, capacitors, power sources 208A, 208B, motors 212, engines, safety equipment, controllers, user interfaces, interior or exterior components, body panels 108, bumpers 216, sensors, and/or combinations thereof. Additionally or alternatively, the mechanisms may provide unique security hardware and/or software embedded therein that, among other things, can prevent fraudulent or low quality construction replacements from being used in the vehicle 100. Similarly, the mechanisms, subsystems, and/or receiving features in the vehicle 100 may employ poka-yoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single-minute exchange ("SME") principle. In some embodiments, for example, the frame 104 may include slides, receptacles, cavities, protrusions, and/or a number of other features that allow for quick exchange of system components. In one embodiment, the frame 104 may include, for example, tray or ledge features, mechanical interconnection features, locking mechanisms, retaining mechanisms, and/or combinations thereof. In some embodiments, it may be beneficial to quickly remove a used power source 208A, 208B (e.g., battery unit, capacitor unit) from the vehicle 100 and replace the used power source 208A, 208B with a charged or new power source. Continuing this example, the power source 208A, 208B may include selectively interchangeable features that interconnect with the frame 104 or other portion of the vehicle 100. For instance, in a power source 208A, 208B replacement, the quick release features may be configured to release the power source 208A, 208B from an engaged position and slide or move in a direction away from the frame 104 of a vehicle 100. Once removed, or separated from, the vehicle, the power source 208A, 208B may be replaced (e.g., with a new power source, a charged power source, etc.) by engaging the replacement power source into a system receiving position adjacent to the vehicle 100. In some embodiments, the vehicle 100 may include one or more actuators configured to position, lift, slide, or otherwise engage the replacement power source with the vehicle 100. In one embodiment, the replacement power source may be inserted into the vehicle 100 or vehicle frame 104 with mechanisms and/or machines that are external and/or separate from the vehicle 100.

In some embodiments, the frame 104 may include one or more features configured to selectively interconnect with other vehicles and/or portions of vehicles. These selectively interconnecting features can allow for one or more vehicles to selectively couple together and decouple for a variety of purposes. For example, it is an aspect of the present disclosure that a number of vehicles may be selectively coupled together to share energy, increase power output, provide security, decrease power consumption, provide towing services, and/or provide a range of other benefits. Continuing this example, the vehicles may be coupled together based on travel route, destination, preferences, settings, sensor information, and/or some other data. The coupling may be initiated by at least one controller of the vehicle and/or traffic control system upon determining that a coupling is beneficial to one or more vehicles in a group of vehicles or a traffic system. As can be appreciated, the power consumption for a group of vehicles traveling in a same direction may be reduced or decreased by removing any aerodynamic separation between vehicles. In this case, the vehicles may be coupled together to subject only the foremost vehicle in the coupling to air and/or wind resistance during travel. In one embodiment, the power output by the group of vehicles may be proportionally or selectively controlled to provide a specific output from each of the one or more of the vehicles in the group.

The interconnecting, or coupling, features may be configured, for example, as electromagnetic mechanisms, mechanical couplings, electromechanical coupling mechanisms, and/or combinations thereof. The features may be selectively deployed from a portion of the frame 104 and/or body of the vehicle 100. In some cases, the features may be built into the frame 104 and/or body of the vehicle 100. In any event, the features may deploy from an unexposed position to an exposed position or may be configured to selectively engage/disengage without requiring an exposure or deployment of the mechanism from the frame 104 and/or body of the vehicle 100. In some embodiments, the interconnecting features may be configured to interconnect one or more of power, communications, electrical energy, fuel, and/or the like. One or more of the power, mechanical, and/or communications connections between vehicles may be part of a single interconnection mechanism. In some embodiments, the interconnection mechanism may include multiple connection mechanisms. In any event, the single interconnection mechanism or the interconnection mechanism may employ the poka-yoke features as described above.

The power system of the vehicle 100 may include the powertrain, power distribution system, accessory power system, and/or any other components that store power, provide power, convert power, and/or distribute power to one or more portions of the vehicle 100. The powertrain may include the one or more electric motors 212 of the vehicle 100. The electric motors 212 are configured to convert electrical energy provided by a power source into mechanical energy. This mechanical energy may be in the form of a rotational or other output force that is configured to propel or otherwise provide a motive force for the vehicle 100.

In some embodiments, the vehicle 100 may include one or more drive wheels 220 that are driven by the one or more electric motors 212 and motor controllers 214. In some cases, the vehicle 100 may include an electric motor 212 configured to provide a driving force for each drive wheel 220. In other cases, a single electric motor 212 may be configured to share an output force between two or more drive wheels 220 via one or more power transmission components. It is an aspect of the present disclosure that the powertrain may include one or more power transmission components, motor controllers 214, and/or power controllers that can provide a controlled output of power to one or more of the drive wheels 220 of the vehicle 100. The power transmission components, power controllers, or motor controllers 214 may be controlled by at least one other vehicle controller or computer system as described herein.

As provided above, the powertrain of the vehicle 100 may include one or more power sources 208A, 208B. These one or more power sources 208A, 208B may be configured to provide drive power, system and/or subsystem power, accessory power, etc. While described herein as a single power source 208 for sake of clarity, embodiments of the present disclosure are not so limited. For example, it should be appreciated that independent, different, or separate power sources 208A, 208B may provide power to various systems of the vehicle 100. For instance, a drive power source may be configured to provide the power for the one or more electric motors 212 of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 208A, 208B in this manner may provide a number of benefits over conventional vehicle systems. For example, separating the power sources 208A, 208B allows one power source 208 to be removed and/or replaced independently without requiring that power be removed from all systems and/or subsystems of the vehicle 100 during a power source 208 removal/replacement. For instance, one or more of the accessories, communications, safety equipment, and/or backup power systems, etc., may be maintained even when a particular power source 208A, 208B is depleted, removed, or becomes otherwise inoperable.

In some embodiments, the drive power source may be separated into two or more cells, units, sources, and/or systems. By way of example, a vehicle 100 may include a first drive power source 208A and a second drive power source 208B. The first drive power source 208A may be operated independently from or in conjunction with the second drive power source 208B and vice versa. Continuing this example, the first drive power source 208A may be removed from a vehicle while a second drive power source 208B can be maintained in the vehicle 100 to provide drive power. This approach allows the vehicle 100 to significantly reduce weight (e.g., of the first drive power source 208A, etc.) and improve power consumption, even if only for a temporary period of time. In some cases, a vehicle 100 running low on power may automatically determine that pulling over to a rest area, emergency lane, and removing, or "dropping off," at least one power source 208A, 208B may reduce enough weight of the vehicle 100 to allow the vehicle 100 to navigate to the closest power source replacement and/or charging area. In some embodiments, the removed, or "dropped off," power source 208A may be collected by a collection service, vehicle mechanic, tow truck, or even another vehicle or individual.

The power source 208 may include a GPS or other geographical location system that may be configured to emit a location signal to one or more receiving entities. For instance, the signal may be broadcast or targeted to a specific receiving party. Additionally or alternatively, the power source 208 may include a unique identifier that may be used to associate the power source 208 with a particular vehicle 100 or vehicle user. This unique identifier may allow an efficient recovery of the power source 208 dropped off. In some embodiments, the unique identifier may provide information for the particular vehicle 100 or vehicle user to be billed or charged with a cost of recovery for the power source 208.

The power source 208 may include a charge controller 224 that may be configured to determine charge levels of the power source 208, control a rate at which charge is drawn from the power source 208, control a rate at which charge is added to the power source 208, and/or monitor a health of the power source 208 (e.g., one or more cells, portions, etc.). In some embodiments, the charge controller 224 or the power source 208 may include a communication interface. The communication interface can allow the charge controller 224 to report a state of the power source 208 to one or more other controllers of the vehicle 100 or even communicate with a communication device separate and/or apart from the vehicle 100. Additionally or alternatively, the communication interface may be configured to receive instructions (e.g., control instructions, charge instructions, communication instructions, etc.) from one or more other controllers or computers of the vehicle 100 or a communication device that is separate and/or apart from the vehicle 100.

The powertrain includes one or more power distribution systems configured to transmit power from the power source 208 to one or more electric motors 212 in the vehicle 100. The power distribution system may include electrical interconnections 228 in the form of cables, wires, traces, wireless power transmission systems, etc., and/or combinations thereof. It is an aspect of the present disclosure that the vehicle 100 includes one or more redundant electrical interconnections 232 of the power distribution system. The redundant electrical interconnections 232 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection 232 is being used and/or damage has occurred to a particular area of the vehicle electrical system. In any event, the one or more redundant electrical interconnections 232 may be configured along completely different routes than the electrical interconnections 228 and/or include different modes of failure than the electrical interconnections 228 to, among other things, prevent a total interruption of power distribution in the event of a failure.

In some embodiments, the power distribution system may include an energy recovery system 236. This energy recovery system 236, or kinetic energy recovery system, may be configured to recover energy produced by the movement of a vehicle 100. The recovered energy may be stored as electrical and/or mechanical energy. For instance, as a vehicle 100 travels or moves, a certain amount of energy is required to accelerate, maintain a speed, stop, or slow the vehicle 100. In any event, a moving vehicle has a certain amount of kinetic energy. When brakes are applied in a typical moving vehicle, most of the kinetic energy of the vehicle is lost as the generation of heat in the braking mechanism. In an energy recovery system 236, when a vehicle 100 brakes, at least a portion of the kinetic energy is converted into electrical and/or mechanical energy for storage. Mechanical energy may be stored, for example, as mechanical movement (e.g., in a flywheel, etc.) and electrical energy may be stored, for example, in batteries, capacitors, and/or some other electrical storage system. In some embodiments, electrical energy recovered may be stored in the power source 208. For example, the recovered electrical energy may be used to charge the power source 208 of the vehicle 100.

The vehicle 100 may include one or more safety systems. Vehicle safety systems can include a variety of mechanical and/or electrical components including, but in no way limited to, low impact or energy-absorbing bumpers 216A, 216B, crumple zones, reinforced body panels, reinforced frame components, impact bars, power source containment zones, safety glass, seatbelts, supplemental restraint systems, air bags, escape hatches, removable access panels, impact sensors, accelerometers, vision systems, radar systems, etc., and/or the like. In some embodiments, the one or more of the safety components may include a safety sensor or group of safety sensors associated with the one or more of the safety components. For example, a crumple zone may include one or more strain gages, impact sensors, pressure transducers, etc. These sensors may be configured to detect or determine whether a portion of the vehicle 100 has been subjected to a particular force, deformation, or other impact. Once detected, the information collected by the sensors may be transmitted or sent to one or more of a controller of the vehicle 100 (e.g., a safety controller, vehicle controller, etc.) or a communication device associated with the vehicle 100 (e.g., across a communication network, etc.).

Figure 3:
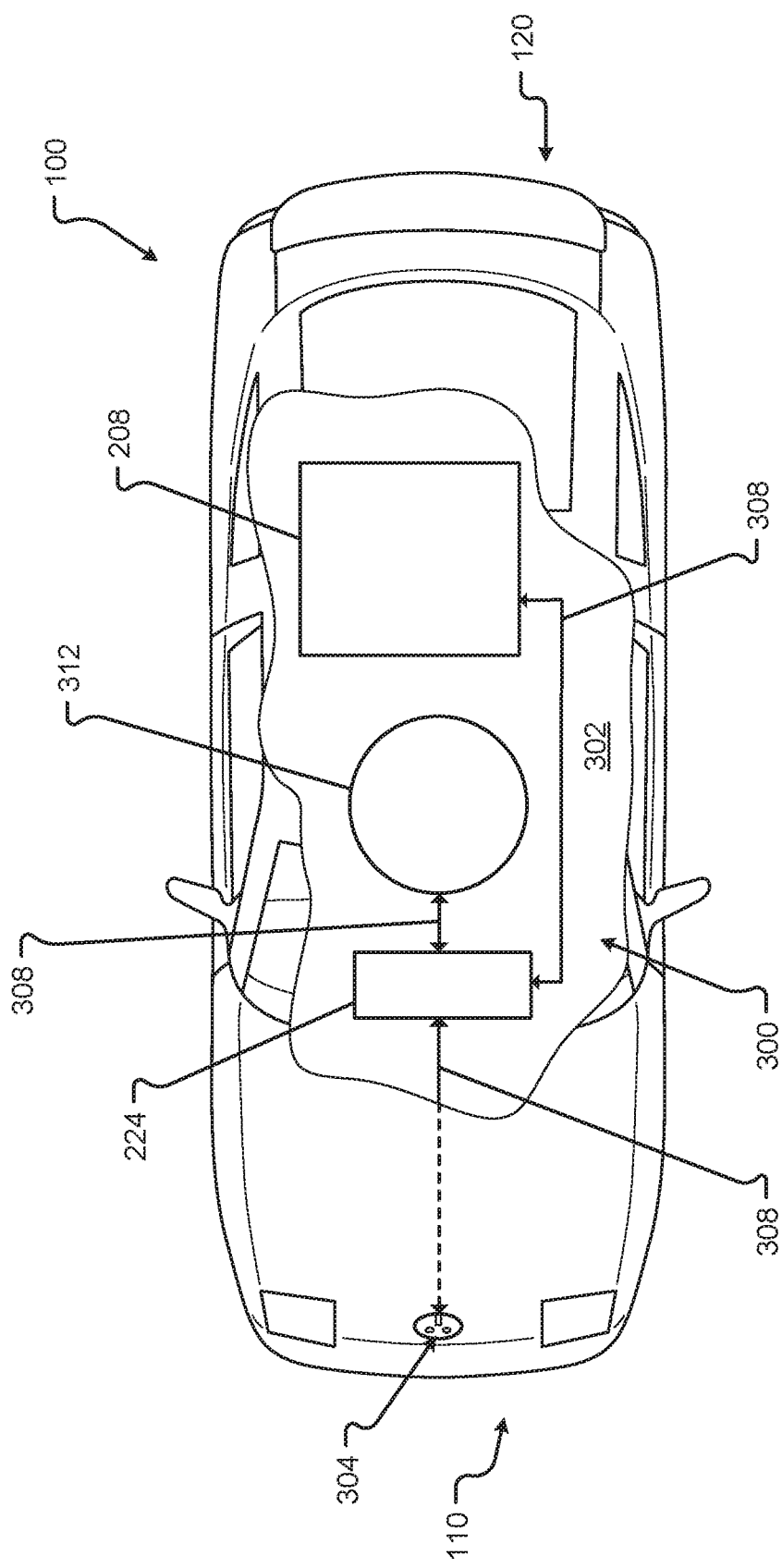
FIG. 3 shows a top plan view of the vehicle in accordance with embodiments of the present disclosure.

FIG. 3 shows a plan view of the vehicle 100 in accordance with embodiments of the present disclosure. In particular, FIG. 3 shows a broken section 302 of a charging system 300 for the vehicle 100. The charging system 300 may include a plug or receptacle 304 configured to receive power from an external power source (e.g., a source of power that is external to and/or separate from the vehicle 100, etc.). An example of an external power source may include the standard industrial, commercial, or residential power that is provided across power lines. Another example of an external power source may include a proprietary power system configured to provide power to the vehicle 100. In any event, power received at the plug/receptacle 304 may be transferred via at least one power transmission interconnection 308. Similar, if not identical, to the electrical interconnections 228 described above, the at least one power transmission interconnection 308 may be one or more cables, wires, traces, wireless power transmission systems, etc., and/or combinations thereof. Electrical energy in the form of charge can be transferred from the external power source to the charge controller 224. As provided above, the charge controller 224 may regulate the addition of charge to at least one power source 208 of the vehicle 100 (e.g., until the at least one power source 208 is full or at a capacity, etc.).

In some embodiments, the vehicle 100 may include an inductive charging system and inductive charger 312. The inductive charger 312 may be configured to receive electrical energy from an inductive power source external to the vehicle 100. In one embodiment, when the vehicle 100 and/or the inductive charger 312 is positioned over an inductive power source external to the vehicle 100, electrical energy can be transferred from the inductive power source to the vehicle 100. For example, the inductive charger 312 may receive the charge and transfer the charge via at least one power transmission interconnection 308 to the charge controller 324 and/or the power source 208 of the vehicle 100. The inductive charger 312 may be concealed in a portion of the vehicle 100 (e.g., at least partially protected by the frame 104, one or more body panels 108, a shroud, a shield, a protective cover, etc., and/or combinations thereof) and/or may be deployed from the vehicle 100. In some embodiments, the inductive charger 312 may be configured to receive charge only when the inductive charger 312 is deployed from the vehicle 100. In other embodiments, the inductive charger 312 may be configured to receive charge while concealed in the portion of the vehicle 100.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

Figure 4:
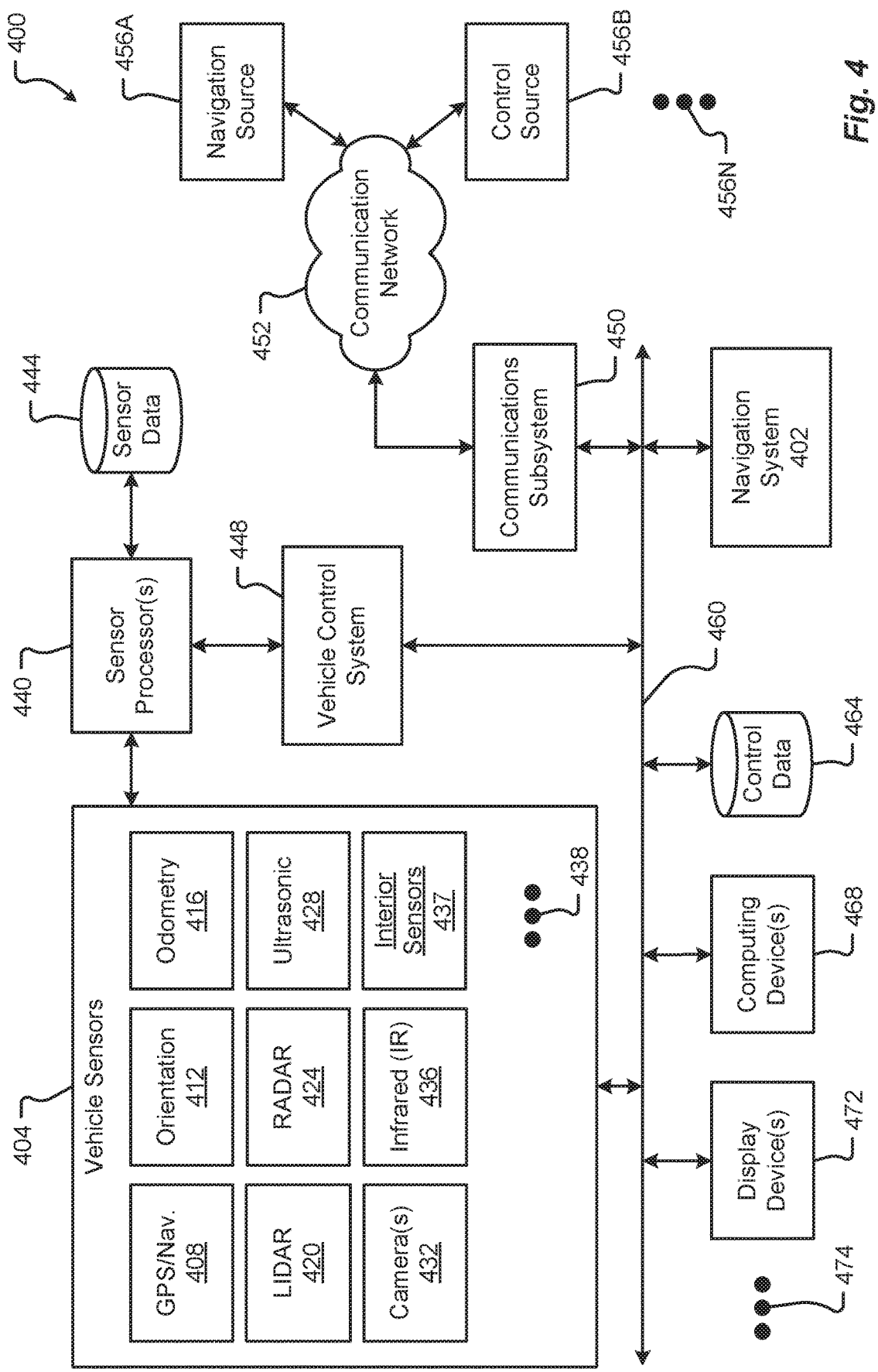
FIG. 4 is a block diagram illustrating an exemplary communication environment of the vehicle in accordance with embodiments of the present disclosure.

FIG. 4 is a block diagram of an embodiment of a communication environment 400 of the vehicle 100 in accordance with embodiments of the present disclosure. The communication system 400 may include one or more vehicle driving vehicle sensors and systems 404, sensor processors 440, sensor data memory 444, vehicle control system 448, communications subsystem 450, control data 464, computing devices 468, display devices 472, and other components 474 that may be associated with a vehicle 100. These associated components may be electrically and/or communicatively coupled to one another via at least one bus 460. In some embodiments, the one or more associated components may send and/or receive signals across a communication network 452 to at least one of a navigation source 456A, a control source 456B, or some other entity 456N.

In accordance with at least some embodiments of the present disclosure, the communication network 452 may comprise any type of known communication medium or collection of communication media and may use any type of protocols, such as SIP, TCP/IP, SNA, IPX, AppleTalk, and the like, to transport messages between endpoints. The communication network 452 may include wired and/or wireless communication technologies. The Internet is an example of the communication network 452 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 452 need not be limited to any one network type, and instead may be comprised of a number of different networks and/or network types. The communication network 452 may comprise a number of different communication media such as coaxial cable, copper cable/wire, fiber-optic cable, antennas for transmitting/receiving wireless messages, and combinations thereof.

The driving vehicle sensors and systems 404 may include at least one navigation 408 (e.g., global positioning system (GPS), etc.), orientation 412, odometry 416, LIDAR 420, RADAR 424, ultrasonic 428, camera 432, infrared (IR) 436, interior 437, and/or other sensor or system 438.

The navigation sensor 408 may include one or more sensors having receivers and antennas that are configured to utilize a satellite-based navigation system including a network of navigation satellites capable of providing geolocation and time information to at least one component of the vehicle 100. Examples of the navigation sensor 408 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 412 may include one or more sensors configured to determine an orientation of the vehicle 100 relative to at least one reference point. In some embodiments, the orientation sensor 412 may include at least one pressure transducer, stress/strain gauge, accelerometer, gyroscope, and/or geomagnetic sensor. Examples of the navigation sensor 408 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, which may perform orientation detection and/or determination functions using any known or future-developed standard and/or architecture.

The odometry sensor and/or system 416 may include one or more components configured to determine a change in position of the vehicle 100 over time. In some embodiments, the odometry system 416 may utilize data from one or more other sensors and/or systems 404 in determining a position (e.g., distance, location, etc.) of the vehicle 100 relative to a previously measured position for the vehicle 100. Additionally or alternatively, the odometry sensors 416 may include one or more encoders, Hall speed sensors, and/or other measurement sensors/devices configured to measure a wheel speed, rotation, and/or number of revolutions made over time. Examples of the odometry sensor/system 416 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Mangnetoresistance (GMR) effect sensors, Infineon TL family of magnetic sensors, EPC Model 25SP AccuCoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 420 may include one or more components configured to measure distances to targets using laser illumination. In some embodiments, the LIDAR sensor/system 420 may provide 3D imaging data of an environment around the vehicle 100. The imaging data may be processed to generate a full 360-degree view of the environment around the vehicle 100. The LIDAR sensor/system 420 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 420 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 420 may detect when light from the plurality of laser beams emitted into the measurement environment returns (e.g., reflected echo) to the LIDAR sensor/system 420. The LIDAR sensor/system 420 may calculate, based on a time associated with the emission of light to the detected return of light, a distance from the vehicle 100 to the illuminated target. In some embodiments, the LIDAR sensor/system 420 may generate over 2.0 million points per second and have an effective operational range of at least 100 meters. Examples of the LIDAR sensor/system 420 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 424 may include one or more radio components that are configured to detect objects/targets in an environment of the vehicle 100. In some embodiments, the RADAR sensors 424 may determine a distance, position, and/or movement vector (e.g., angle, speed, etc.) associated with a target over time. The RADAR sensors 424 may include a transmitter configured to generate and emit electromagnetic waves (e.g., radio, microwaves, etc.) and a receiver configured to detect returned electromagnetic waves. In some embodiments, the RADAR sensors 424 may include at least one processor configured to interpret the returned electromagnetic waves and determine locational properties of targets. Examples of the RADAR sensors 424 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 428 may include one or more components that are configured to detect objects/targets in an environment of the vehicle 100. In some embodiments, the ultrasonic sensors 428 may determine a distance, position, and/or movement vector (e.g., angle, speed, etc.) associated with a target over time. The ultrasonic sensors 428 may include an ultrasonic transmitter and receiver, or transceiver, configured to generate and emit ultrasound waves and interpret returned echoes of those waves. In some embodiments, the ultrasonic sensors 428 may include at least one processor configured to interpret the returned ultrasonic waves and determine locational properties of targets. Examples of the ultrasonic sensors 428 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 432 may include one or more components configured to detect image information associated with an environment of the vehicle 100. In some embodiments, the camera sensors 432 may include a lens, filter, image sensor, and/or a digital image processer. It is an aspect of the present disclosure that multiple camera sensors 432 may be used together to generate stereo images providing depth measurements. Examples of the camera sensors 432 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 436 may include one or more components configured to detect image information associated with an environment of the vehicle 100. The IR sensors 436 may be configured to detect targets in low-light, dark, or poorly-lit environments. The IR sensors 436 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 436 may include at least one processor configured to interpret the returned IR light and determine locational properties of targets. The IR sensors 436 may be configured to detect and/or measure a temperature associated with a target (e.g., an object, pedestrian, other vehicle, etc.). Examples of IR sensors 436 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

The interior sensors 437 may include passenger compartment temperature sensors (utilized, e.g., in connection with a vehicle climate control system), passenger compartment occupancy sensors (utilized, e.g., in connection with vehicle safety systems, including passive and active restraint systems); wheel-speed sensors (utilized, e.g., in connection with an anti-lock braking system and/or an electronic traction control system); door sensors (utilized, e.g., to communicate to a vehicle operator whether the vehicle doors are locked or unlocked, and/or open or closed); light sensors (utilized, e.g., to automatically adjust the brightness of instrument panel lighting); electronic system temperature sensors (utilized, e.g., to determine whether vehicle electronic systems are within appropriate operating temperature ranges, and, in some embodiments, to enable a vehicle cooling system to route coolant to electronic systems within the vehicle that are most in need of cooling); coolant temperature sensors (utilized, e.g., to facilitate efficient vehicle thermal management); and pressure-temperature transducers (also utilized, e.g., to facilitate efficient vehicle thermal management).

A navigation system 402 can include any hardware and/or software used to navigate the vehicle either manually or autonomously.

In some embodiments, the driving vehicle sensors and systems 404 may include other sensors 438 and/or combinations of the sensors 408-437 described above. Additionally or alternatively, one or more of the sensors 408-437 described above may include one or more processors or controllers configured to process and/or interpret signals detected by the one or more sensors 408-437. In some embodiments, the processing of at least some sensor information provided by the vehicle sensors and systems 404 may be processed by at least one sensor processor 440. Raw and/or processed sensor data may be stored in a sensor data memory 444 storage medium. In some embodiments, the sensor data memory 444 may store instructions used by the sensor processor 440 for processing sensor information provided by the sensors and systems 404. In any event, the sensor data memory 444 may be a disk drive, optical storage device, solid-state storage device such as a random-access memory ("RAM") and/or a read-only memory ("ROM"), which can be programmable, flash-updateable, and/or the like.

The vehicle control system 448 may receive processed sensor information from the sensor processor 440 and determine to control an aspect of the vehicle 100. Controlling an aspect of the vehicle 100 may include presenting information via one or more display devices 472 associated with the vehicle, sending commands to one or more computing devices 468 associated with the vehicle, and/or controlling a driving operation of the vehicle. In some embodiments, the vehicle control system 448 may correspond to one or more computing systems that control driving operations of the vehicle 100 in accordance with the Levels of driving autonomy described above. In one embodiment, the vehicle control system 448 may operate a speed of the vehicle 100 by controlling an output signal to the accelerator and/or braking system of the vehicle. In this example, the vehicle control system 448 may receive sensor data describing an environment surrounding the vehicle 100 and, based on the sensor data received, determine to adjust the acceleration, power output, and/or braking of the vehicle 100. The vehicle control system 448 may additionally control steering and/or other driving functions of the vehicle 100.

The vehicle control system 448 may communicate, in real-time, with the driving sensors and systems 404 forming a feedback loop. In particular, upon receiving sensor information describing a condition of targets in the environment surrounding the vehicle 100, the vehicle control system 448 may autonomously make changes to a driving operation of the vehicle 100. The vehicle control system 448 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 404, vehicle control system 448, display devices 472, etc.) may communicate across the communication network 452 to one or more entities 456A-N via a communications subsystem 450 of the vehicle 100. For instance, the navigation sensors 408 may receive global positioning, location, and/or navigational information from a navigation source 456A. In some embodiments, the navigation source 456A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 448 may receive control information from one or more control sources 456B. The control source 456 may provide vehicle control information including autonomous driving control commands, vehicle operation override control commands, and the like. The control source 456 may correspond to an autonomous vehicle control system, a traffic control system, an administrative control entity, and/or some other controlling server. It is an aspect of the present disclosure that the vehicle control system 448 and/or other components of the vehicle 100 may exchange communications with the control source 456 across the communication network 452 and via the communications subsystem 450.

Information associated with controlling driving operations of the vehicle 100 may be stored in a control data memory 464 storage medium. The control data memory 464 may store instructions used by the vehicle control system 448 for controlling driving operations of the vehicle 100, historical control information, autonomous driving control rules, and the like. In some embodiments, the control data memory 464 may be a disk drive, optical storage device, solid-state storage device such as a random-access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

For an autonomous, semi-autonomous, or manually operated electric vehicle 100 as described above, thermal management is critical. For example, the batteries or other power source; the inverters, drive motors, and/or other electrical drivetrain system ("EDS") components; and other electrical components in the vehicle 100 need to be sufficiently cooled. Failure to provide sufficient cooling to these components can result in damage to or even catastrophic failure of the components. Autonomous vehicles in particular must prove to be resilient to avoid such failures and continue to operate in a safe manner until the vehicle can be driven to a repair location or at least removed from a roadway to a shoulder or parking area. Additionally, the cabin must be maintained at a comfortable temperature for the occupants therein, which may require heating on cool or cold days and cooling on warm or hot days.

The present disclosure, then, discloses a three-loop, two-pump thermal management system that allows one or more loops to be placed offline when not needed to reduce energy usage. The architecture of the thermal management system disclosed herein allows the pumps of the system to be placed at a location far from the cabin to reduce noise, vibration, and harshness in the cabin. Further, the arrangement of the dual pumps of the thermal management system disclosed herein allows the system to continue operating in multiple failure modes, thus allowing the vehicle 100 to travel longer distances than were previously possible before being repaired.

The thermal management system of the present application uses a direct heat pump system to heat up cabin air. A water loop heater coil (which is a liquid/air heat exchanger) may be used when the outside temperature is below the heating, ventilation, and cooling ("HVAC") system functional limit. An electric heater is used to heat up the coolant (e.g., water), which is then used to heat cabin air. When the cabin warming demand is low, the cabin is warmed by harvesting excess heat from the battery, motors, and/or other electrical components of the vehicle 100 without using the HVAC heat pump. One or both of the pumps in the thermal management system may be used depending on the operating mode of the thermal management system.

Figure 5:
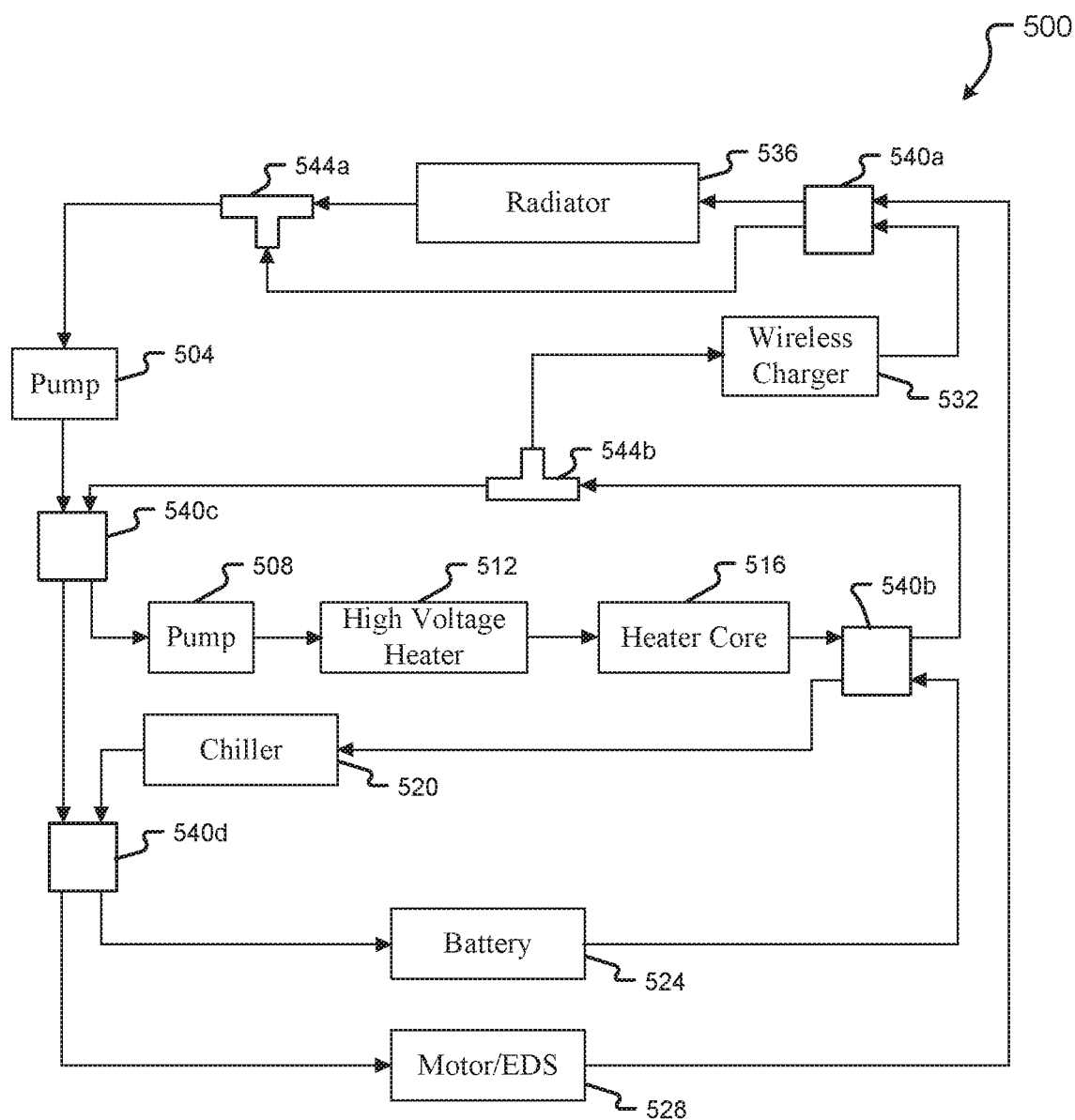
FIG. 5 is a diagram of a thermal management system in accordance with embodiments of the present disclosure.

Turning now to FIG. 5, a thermal management system 500 of a vehicle 100 according to embodiments of the present disclosure comprises two pumps 504 and 508; a high voltage heater 512; a heater core 516; a chiller 520; a radiator 536; a plurality of four-way valves 540*a-d*; and a plurality of T-joints 544*a-b*. The thermal management system 500 is configured to transfer heat between or among a coolant circulating through the thermal management system 500 (e.g., water or refrigerant) and a battery 524, a motor/EDS 528, a wireless charger 532, and cabin air (not shown).

It should be appreciated that the thermal management systems described herein may be used in non-autonomous, semi-autonomous, and autonomous vehicles alike.

The pumps 504 and 508 may be any pumps suitable for circulating coolant through the thermal management system 500. The pumps 504 and 508 may be selected based on the type of coolant being used (e.g., water, refrigerant); the total length of the coolant conduits of the thermal management system 500; the flow rate(s) required to achieve sufficient thermal management of the components of the vehicle 100 and/or of the cabin air temperature in the various operating modes of the thermal management system 500; the volume of coolant contained within the thermal management system 500; the total pressure drop across the components of the thermal management system 500; and the available power (whether from the battery 524 or elsewhere) for running the pumps 504 and 508. The pumps 504 and 508 may each be independently capable of creating a pressure differential sufficient to circulate coolant through the thermal management system 500 in one or more configurations.

The high voltage heater 512 converts electrical energy into heat, which heat is transferred to water or other coolant being circulated through the thermal management system 500. The heater core 516 is a water loop heater coil or other liquid/air heat exchanger that transfers heat from the thermal management system coolant to air traveling past the liquid/air heat exchanger so as to condition the air for cabin temperature control purposes. The chiller 520 removes heat from the thermal management system coolant, and may be a vapor-compression chiller. The chiller 520 may comprise, for example, a reciprocating compressor, a scroll compressor, a screw-driven compressor, and/or a centrifugal compressor. The chiller 520 may utilize a refrigerant (separate from the coolant of the thermal management system 500) as a working fluid for extracting heat from the thermal management system coolant.

The battery 524 may be any battery or other power source that provides power to the vehicle 100. The battery 524 may operate most efficiently (and/or most safely) within certain temperature ranges, and therefore may require preheating before use (e.g., in cold temperatures) and/or cooling before and/or during use. The battery 524 may be the same as or similar to the power sources 208A, 208B discussed above.

The motor/EDS 528 may be or comprise one or more motors or other propulsion devices utilized to propel the vehicle 100. The motor/EDS 528 may also include one or more additional electrical drivetrain system components, such as a motor controller. In some embodiments, the one or more motors of the motor/EDS 528 may the same as or similar to the motor 212 discussed above, and the motor/

EDS 528 may comprise one or more motor controllers that are the same as or similar to the motor controllers 214 discussed above.

Also in some embodiments, one or both of the battery 524 and/or the motor/EDS 528 may comprise one or more components of a heat exchanger, which may be the same as or similar to the heater core 516 used to heat the cabin for cabin comfort purposes. In embodiments equipped with a heat pump system, the chiller 520 can be used to recover heat released into the cooling system by the motor and battery The wireless charger 532 may comprise one or more elements of a wireless charging system that recharges the battery 524. For example, the wireless charger 532 may comprise an induction charger such as the induction charger 312 discussed above, and/or a charge controller such as the charger controller 324 discussed above.

The radiator 536 may be any radiator known in the art that is suitable for transferring heat from coolant flowing therethrough to the surrounding atmosphere. The particular design and specifications of the radiator 536 may be selected, for example, based on the type of coolant being used in the thermal management system 500, and the needed volume flow rate of air to achieve the desired amount of cooling. In some embodiments, the radiator 536 may comprise an electrically operated fan or other device for generating airflow past the radiator 536. The fan may be used, for example, when the vehicle 100 is not moving, but the radiator is being used for extracting heat from coolant flowing therethrough.

In the thermal management system 500, the valves 540a-d are four-way valves of the design described in U.S. patent application Ser. No. 15/802,651, or other four-way valves having the same functionality as the valves described in U.S. patent application Ser. No. 15/802,651. More particularly, the valves 540a-d are capable of multiple operational modes as depicted in FIGS. 4A to 4J of U.S. patent application Ser. No. 15/802,651 (which, as noted above, is incorporated by reference herein), including (1) flow between port 1 and port 2 and between port 3 and port 4 (referred to herein as a "straight-through configuration"); (2) flow between port 1 and port 2 with ports 3 and 4 closed (referred to herein as a "straight-through single path configuration"); (3) all ports closed (referred to herein as a "closed configuration"); (4) flow between port 2 and port 4, with ports 1 and 3 closed (referred to herein as a "crossflow single path configuration"); (5) flow between port 2 and port 4 and between port 1 and port 3 (referred to herein as a "crossflow configuration"); (6) flow between port 1 and port 3 with ports 2 and 4 closed (also referred to herein as "crossflow single path configuration"); (7) flow between port 2 and port 3 with ports 1 and 4 closed (referred to herein as a "reverse single path configuration"); (8) flow between port 2 and port 3 and between port 1 and port 4 (referred to herein as a "reverse configuration"); (9) flow between port 1 and port 4 with ports 2 and 3 closed (also referred to herein as a "reverse single path configuration"); and (10) flow between port 3 and port 4 with ports 1 and 2 closed (also referred to herein as a "straight-through single path configuration").

In some embodiments, two valves such as the valves 540a-d may be connected to each other to create an effective 6-way valve, which may then be used to provide additional interconnections between or among the loops of the thermal management system 500, and/or with other coolant or refrigerant loops.

The T-joints 544a-b of the thermal management system 500 receive coolant at either of two inlets and channel the coolant through a single outlet, and/or receive coolant at one inlet and channel the coolant to one of two outlets.

As illustrated in FIG. 5, the thermal management system 500 is arranged in three separate, but interconnectable, loops. The first loop comprises the pump 504 and the radiator 536 and is configured to route coolant to the motor/EDS 528. The first loop further comprises the four-way valves 540c, 540d, and 540a, and the T-joint 544a. Also included in the first loop is a radiator bypass conduit positioned between the four-way valve 540a and the T-joint 544a, and configured to route coolant around the radiator 536.

The second loop comprises the pump 508, the high voltage heater 512, and the heater core 516. The second loop also comprises the four-way valves 540c (by which the second loop is selectively interconnectable with the first loop) and 540b.

The third loop comprises the chiller 520 and is configured to route coolant to the battery 524. The third loop also comprises the four-way valve 540d (by which the third loop is selectively interconnectable with the first loop) and the four-way valve 540b (by which the third loop is selectively interconnectable with the second loop).

The second loop is also selectively interconnectable with the first loop via a coolant conduit that connects the T-joint 544b (located on the second loop) with the four-way valve 540a (located on the first loop), which coolant conduit routes coolant to the wireless charger 532.

Various modes of operation of the thermal management system 500 will now be described with respect to FIGS. 6-17, in which active coolant flow paths are shown in solid lines between numbered elements, and inactive coolant flow paths are shown in dashed lines between numbered elements. Additionally, the pump 504 or 508, the high voltage heater 512, the heater core 516, and/or the chiller 520 may be shown in dashed lines to indicate that the component is non-operational in the particular mode being illustrated and described, even though coolant may still be routed therethrough.

Figure 6:
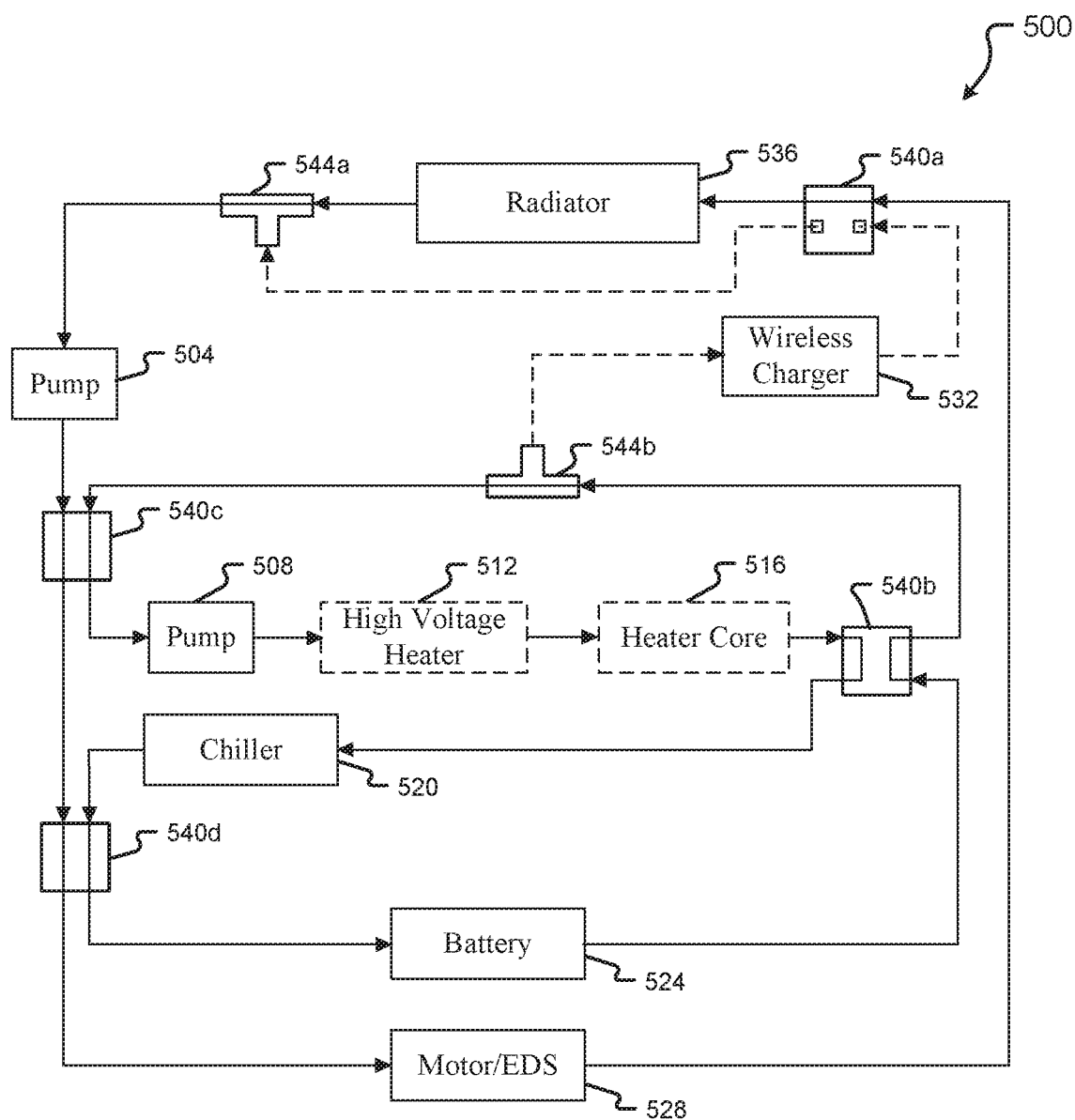
FIG. 6 is a diagram of the thermal management system of FIG. 5 in a first configuration in accordance with embodiments of the present disclosure.

With reference, then, to FIG. 6, the thermal management system 500 may be placed in a maximum cooling mode wherein each pump 504, 508 circulates coolant around a separate loop, one for cooling the motor/EDS 528 and the other for cooling the battery 524. In this configuration, the flow path between the T-joint 544b and the T-joint 544a (which flow path passes through the wireless charger 532 and the four-way valve 540a) is inactive, and neither the high voltage heater 512 nor the heater core 516 is operational. Also in this configuration, pump 504 circulates coolant through four-way valves 540c and 540d, both of which are in a straight-through configuration, to the motor/EDS 528, where the coolant extracts heat from, and thus cools, the motor/EDS 528. The heated coolant then flows through the valve 540a, which is in a straight-through single path configuration, to the radiator 536, where the coolant exchanges heat with outside air, thus reducing the temperature of the coolant. The cooled coolant is then channeled to the T-joint 544a and back to the pump 504. In some embodiments, the valve 540a may be in a straight-through configuration, but without a pump creating a pressure differential along the flow path from T-joint 544b to T-joint 544a, there may be little or no flow through one of the two flow paths through the valve 540a.

Also in the configuration of FIG. 6, the pump 508 circulates coolant to the chiller 520 via the nonoperational high voltage heater 512, the nonoperational heater core 516, and the four-way valve 540b (which is in a reverse configuration). The chilled coolant exiting the chiller 520 is routed through the four-way valve 540d to the battery 524, then back to the pump 508 via the four-way valve 540b, the T-joint 544b, and the four-way valve 540c. The valves 540c and 540d are in a straight-through configuration.

Figure 7:
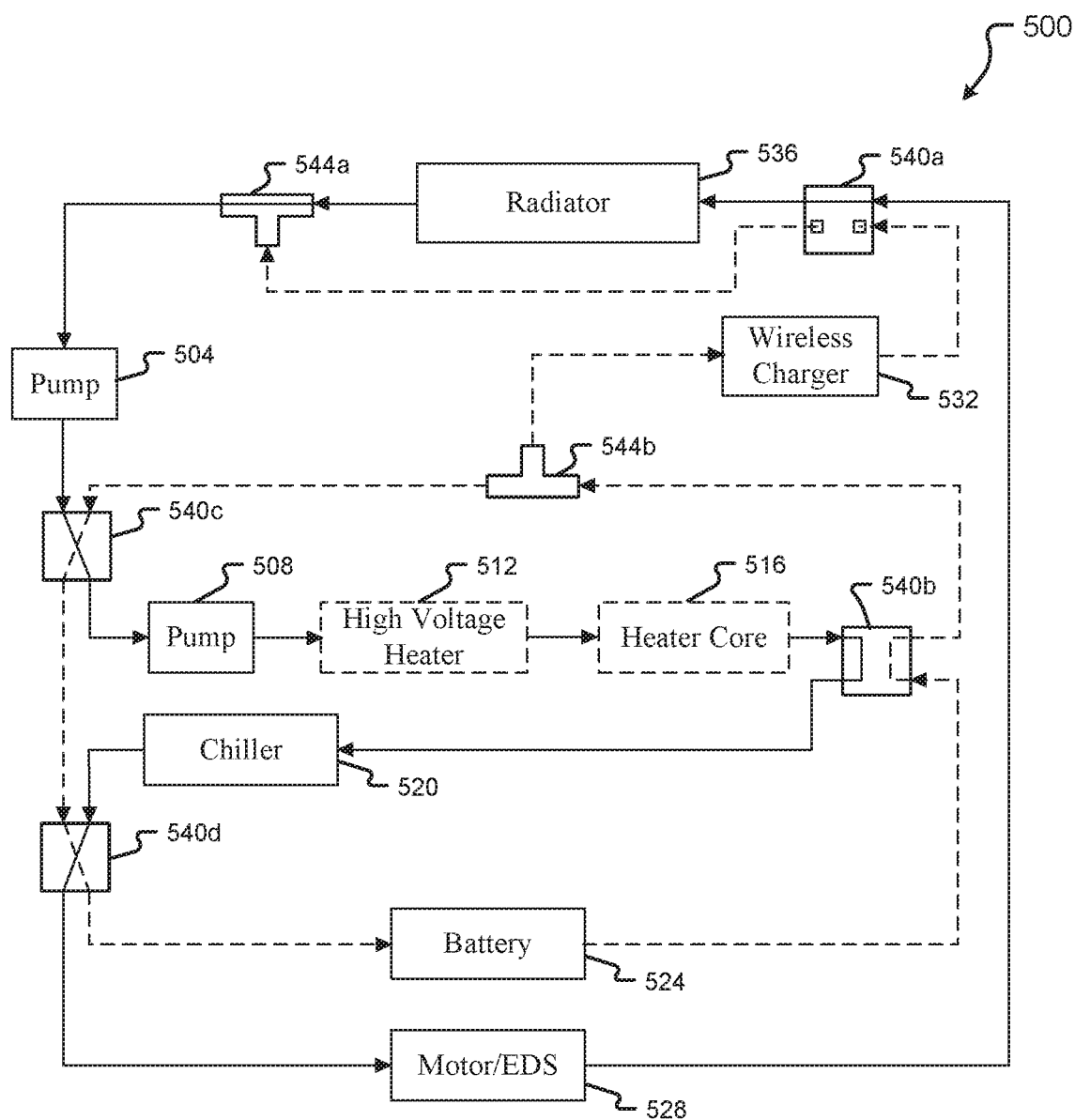
FIG. 7 is a diagram of the thermal management system of FIG. 5 in a second configuration in accordance with embodiments of the present disclosure.

With reference now to FIG. 7, the thermal management system 500 may also be configured to utilize all cooling components for two-stage cooling of the motor/EDS 528. More specifically, with both pumps 504 and 508 operational, coolant is pumped through the radiator 536 for first-stage cooling, then through the chiller 520 for second-stage cooling before being channeled to the motor/EDS 528, where the twice-cooled coolant is able to extract maximum heat. The heated coolant then flows back to the radiator 536 to repeat the loop. In this configuration, the high voltage heater 512 and the heater core 516 are both non-operational. The four-way valve 540a is in a straight-through single path configuration, the four-way valve 540b is in a reverse single path configuration, the four-way valve 540c is in a crossflow single path configuration, and the four-way valve 540d is also in a crossflow single path configuration. With the four-way valves 540a-d in these configurations, no coolant flows past the battery 524 or the wireless charger 532, and all coolant flows through a single loop. As may be appreciated based on the foregoing disclosure, if one of the two pumps 504 and 508 were to fail, coolant could still be circulated through the described loop by the operational pump, although rate of coolant flow (and thus the cooling rate) may be affected by the reduction in available pumping capacity.

In some embodiments, the valve 540a may be in a straight-through configuration, the valve 540b may be in a reverse configuration, and the valves 540c and 540d may be in a crossflow configuration. However, without a pump creating a pressure differential along the flow path shown in dotted lines in FIG. 7, there may be little or no flow through one of the flow paths of each of valves 540a, 540b, 540c, and 540d.

Figure 8:
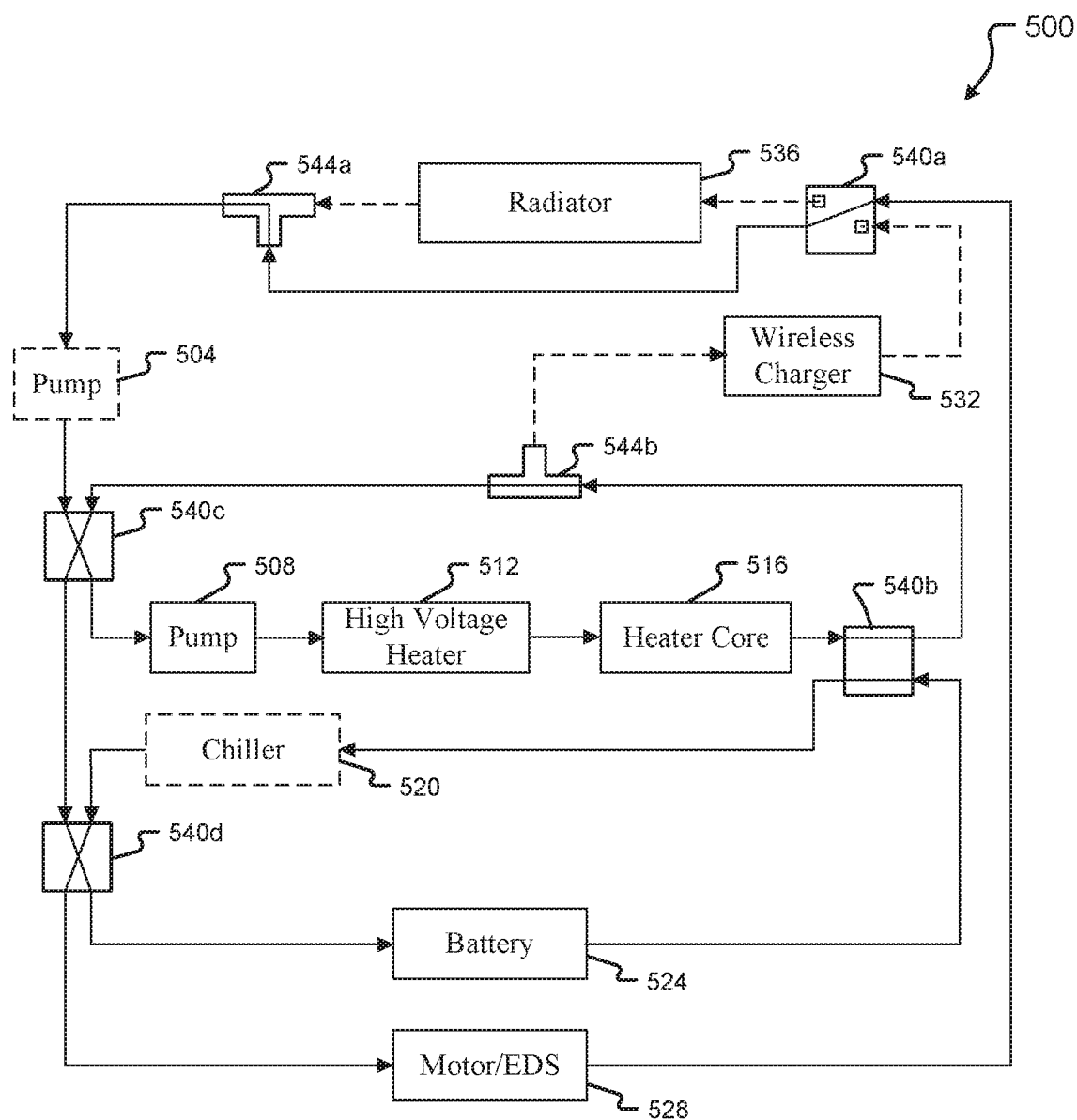
FIG. 8 is a diagram of the thermal management system of FIG. 5 in a third configuration in accordance with embodiments of the present disclosure.

With reference now to FIG. 8, the thermal management system 500 may be configured with a single loop for maximum heating of the cabin of the vehicle 100 and of the battery 524. The loop is created by placing the four-way valve 540a in a crossflow single path configuration, the four-way valve 540b in a straight-through configuration, and the four-way valves 540c and 540d in a crossflow configuration. Additionally, the pump 504 is deactivated to conserve energy, and the chiller, which cools rather than heats coolant, is also deactivated. The resulting flow path causes coolant to flow from the pump 508 through the high voltage heater 512 (which warms the coolant), the heater core 516 (which transfers heat from the warm coolant to the cabin air, thus heating the cabin air), the battery 524 (which is warmed by the warm coolant), and then through the motor/EDS 528 (which contributes heat to, and is therefore cooled by, the coolant) before returning to the pump 528. Flow paths through the wireless charger 532 and the radiator 536 are closed in this configuration.

In some embodiments, the valve 540a may be in a crossflow configuration, but without a pump creating a pressure differential along the flow path shown in dotted lines in FIG. 8, there may be little or no flow through one of the two flow paths through the valve 540a.

Figure 9:
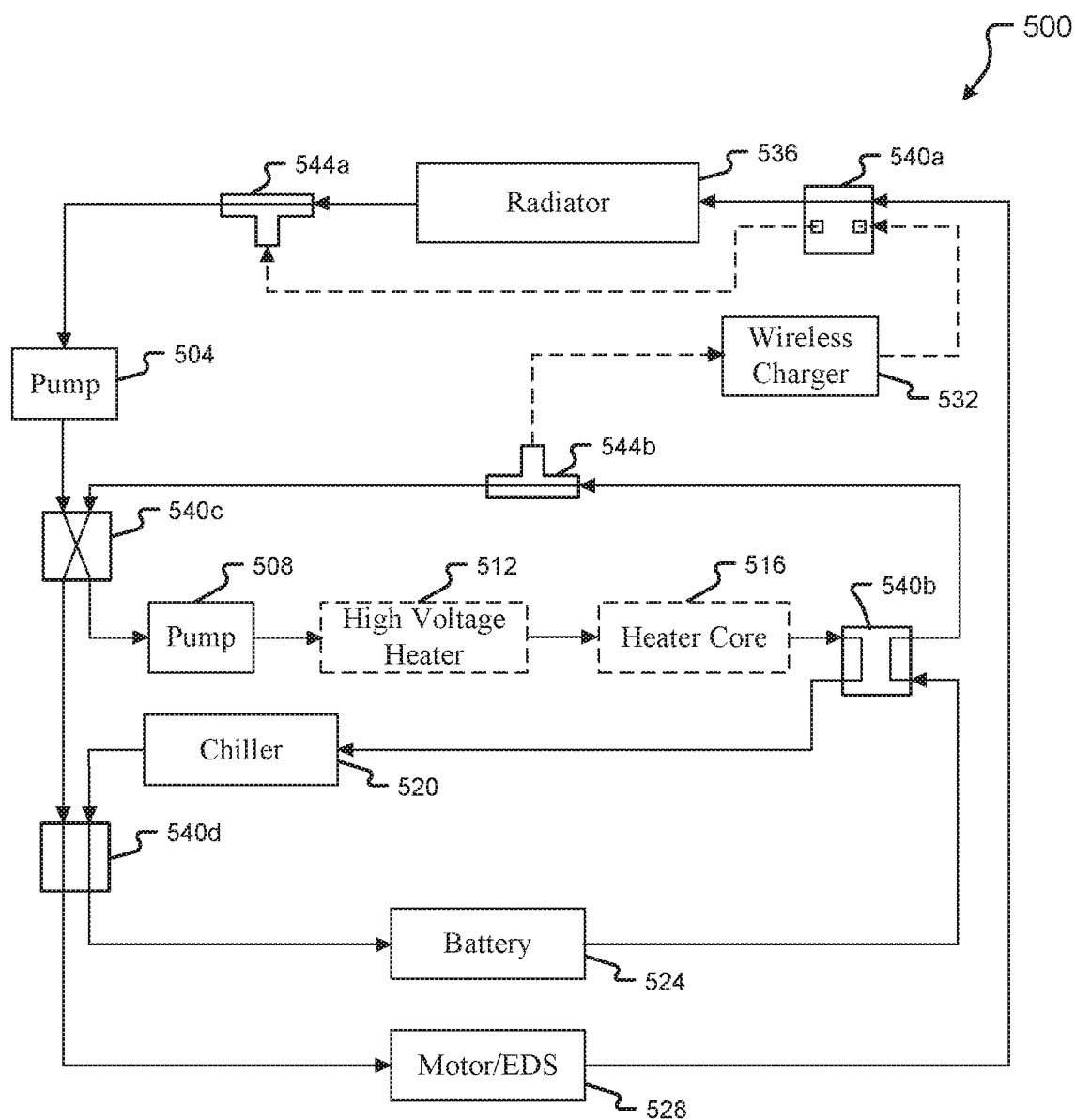
FIG. 9 is a diagram of the thermal management system of FIG. 5 in a fourth configuration in accordance with embodiments of the present disclosure.

FIG. 9 depicts a two-stage cooling configuration of the thermal management system 500, in which the valves 540a-d are configured to create a single loop that includes both the battery 524 and the motor/EDS 528. More specifically, the valve 540a is configured in a straight-through single path configuration, the valve 540b is configured in a reverse configuration, the valve 540c is configured in a crossflow configuration, and the valve 540d is configured in a straight-through configuration. Both pumps 504 and 508 are activated to achieve the desired coolant flow rate, and the heating components (e.g., the high voltage heater 512 and the heater core 516) are de-activated. In the maximum cooling configuration, coolant flows into and extracts heat from the battery 524 before then flowing through and extracting heat from the motor/EDS 528. The heated coolant then flows to and is cooled in the radiator 536, before flowing through the pumps 504 and 508 to the chiller 520, where the coolant is further cooled before being routed again to the battery 524.

In some embodiments, the valve 540a may be in a straight-through configuration, but without a pump creating a pressure differential along the flow path from T-joint 544b to T-joint 544a, there may be little or no flow through one of the two flow paths through the valve 540a.

Figure 10:
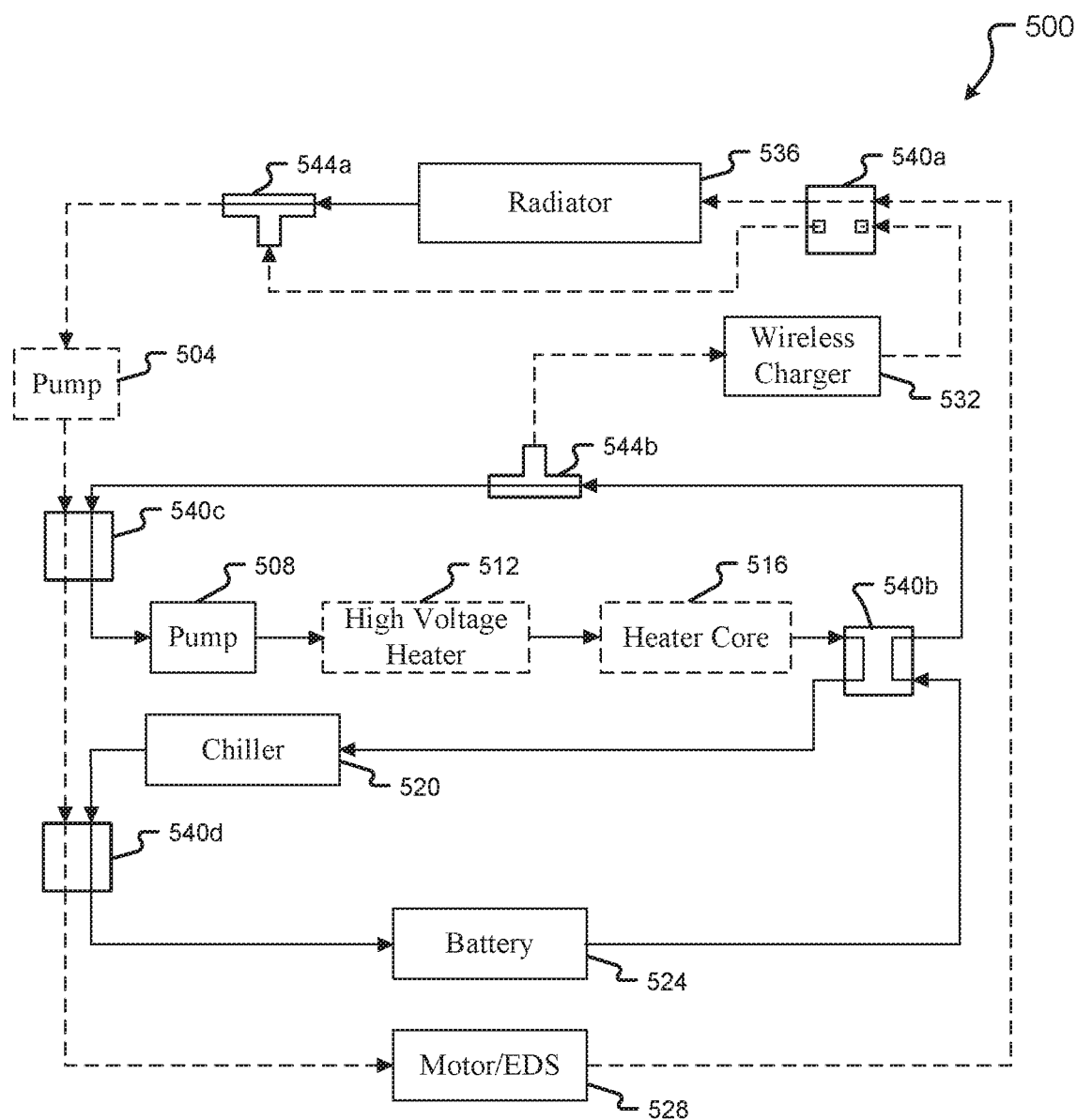
FIG. 10 is a diagram of the thermal management system of FIG. 5 in a fifth configuration in accordance with embodiments of the present disclosure.

FIG. 10 depicts a possible configuration for cooling the battery 524 during charging. As may be appreciated, the vehicle 100 may be stationary while the battery 524 is being charged, such that the radiator 536 is rendered less effective or ineffective (e.g., due to the lack of airflow passing through the radiator 536). Further, if the vehicle 100 is stationary, then the motor/EDS 528 likely does not need to be cooled. In the configuration of FIG. 10, then, the valves 540a-d are configured to create a single loop, with the valve 540a in a closed configuration, the valve 540b in a reverse configuration, and the valves 540c and 540d in a straight-though single path configuration. The high voltage heater 512 and heater core 516 are included in the flow path but are de-activated. Pump 504, which lies outside the active loop created by the foregoing valve configurations, is also de-activated, thus conserving energy. The pump 508 maintains coolant flow through the loop, which routes coolant through the chiller 520 to be cooled before flowing to the battery 524 to extract heat therefrom (which heat is generated during charging of the battery 524).

In some embodiments, the valve 540a may be in a straight through configuration or in any other configuration, and the valves 540c and 540d may be in a straight-through configuration. However, without a pump creating a pressure differential along the flow paths shown in dotted lines in FIG. 10, there may be little or no flow through the valve 540a or through one of the flow paths of each of the valves 540c and 540d.

Figure 11:
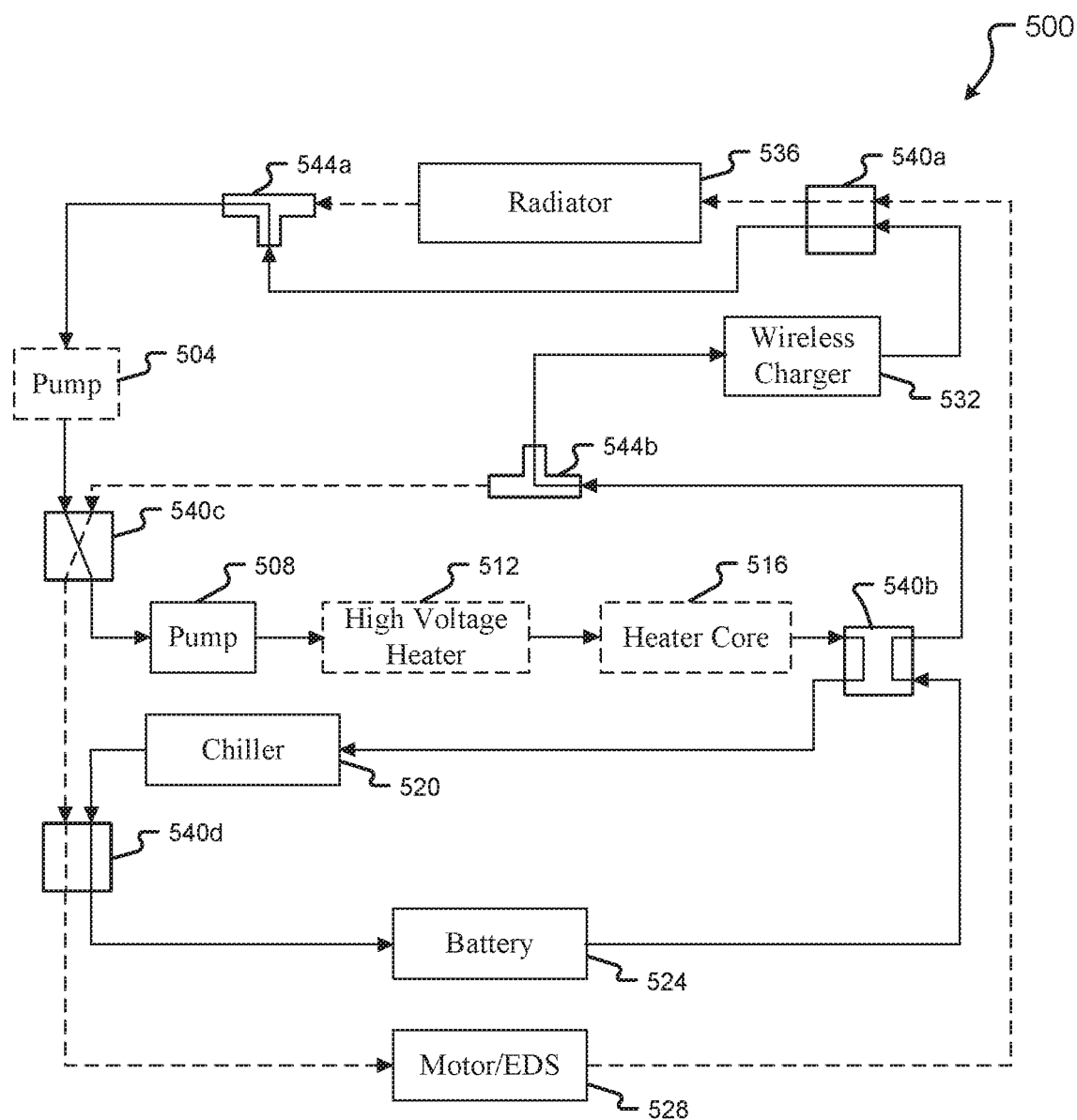
FIG. 11 is a diagram of the thermal management system of FIG. 5 in a sixth configuration in accordance with embodiments of the present disclosure.

With reference now to FIG. 11, the thermal management system 500 may be configured with a single loop intended to cool the wireless charger 532. In this configuration, the valve 540a has a straight-through single path configuration, the valve 540b has a reverse configuration, the valve 540c has a crossflow single path configuration, and the valve 540d has a straight-through single path configuration. The pump 504 is deactivated, as are the high voltage heater 512 and the heater core 516. Coolant is chilled by the chiller 520 before flowing to and extracting heat from both the battery 524 and the wireless charger 532. In this embodiment, no coolant flows through the radiator 536 or past the motor/EDS 528, again because the vehicle 100 may be stationary (such that the radiator 536 is ineffective or less effective, and the motor/EDS 528 is not being used and therefore not in need of cooling) when being charged via the wireless charger 532.

In some embodiments, the valves 540a and 540d may be in a straight-through configuration, and the valve 540c may be in a crossflow configuration, but without a pump creating a pressure differential along the flow path shown in dotted lines in FIG. 11, there may be little or no flow through one of the two flow paths of each of valves 540a, 540c, and 540d.

Figure 12:
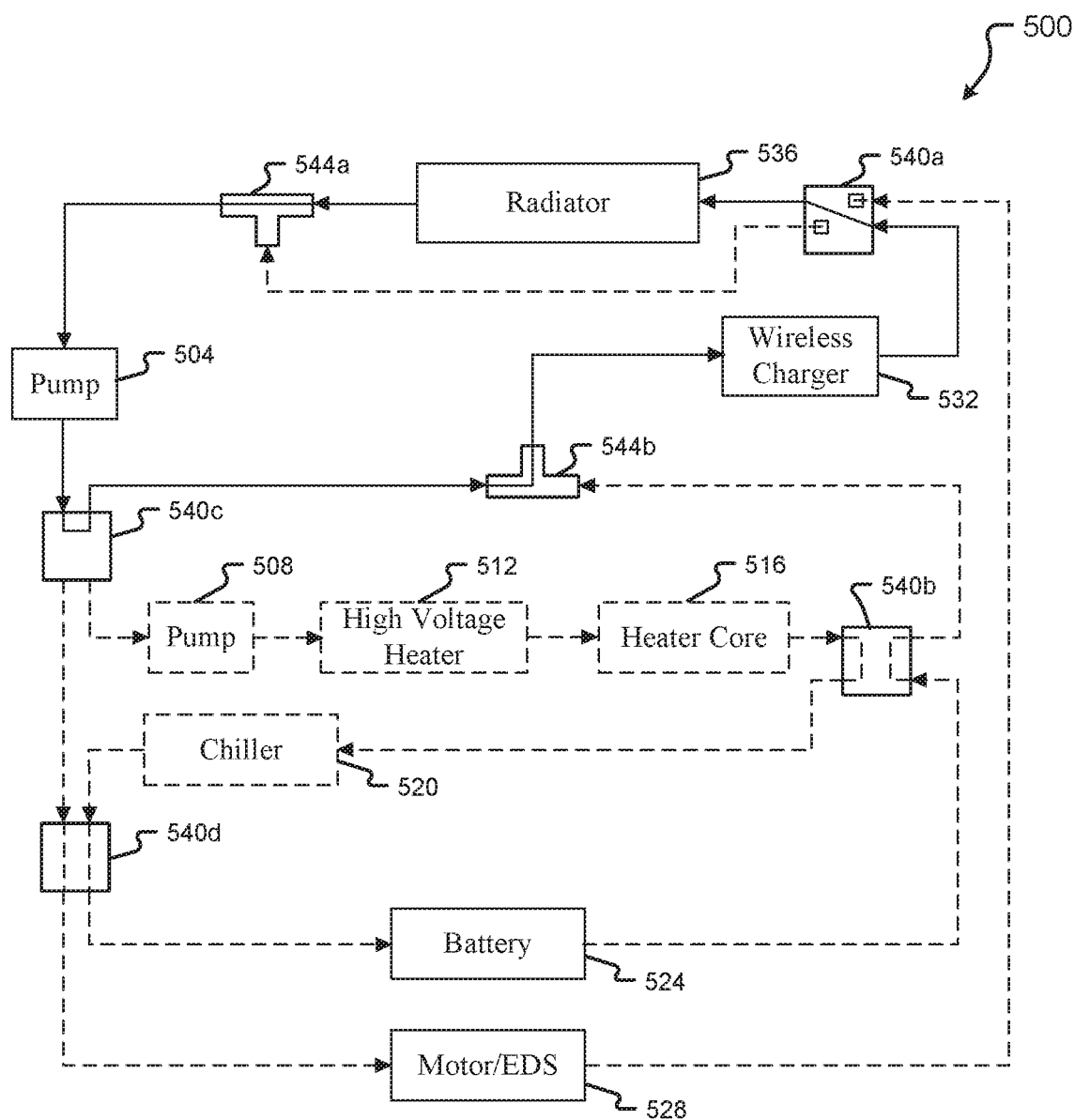
FIG. 12 is a diagram of the thermal management system of FIG. 5 in a seventh configuration in accordance with embodiments of the present disclosure.

Turning now to FIG. 12, an alternative mode of the thermal management system 500 useful for cooling the wireless charger 532 utilizes the radiator 536 instead of the chiller 520 to cool the coolant. This mode may be useful, for example, in cold temperatures where the low outside temperature offsets the lack of airflow past the radiator 536 enough to sufficiently cool the coolant passing through the radiator 536. In this configuration, the valve 540a is in a crossflow single path configuration, the valve 540b is in a closed configuration, the valve 540c is in a reverse single path configuration, and the valve 540d is in a closed configuration. The pump 508, the high voltage heater 512, the heater core 516, and the chiller 520 are all de-activated, and no coolant flows to the battery 524 or the motor/EDS 528. Instead, with the pump 504 active, coolant is routed to the wireless charger 532, from which the coolant extracts heat, and then to the radiator 536, where heat is extracted from the coolant.

In some embodiments, the valve 540a may be in a crossflow configuration, the valve 540b may be in any configuration other than a closed configuration, the valve 540c may be in a reverse configuration, and the valve 540d may be in any configuration other than a closed configuration. However, because there is no pump creating a pressure differential along the flow paths shown in dotted lines in FIG. 12, there may be little or no flow through one of the two flow paths through the valves 540a and 540c, and there may be little or no flow through either of the two flow paths through the valves 540b and 540d.

Figure 13:
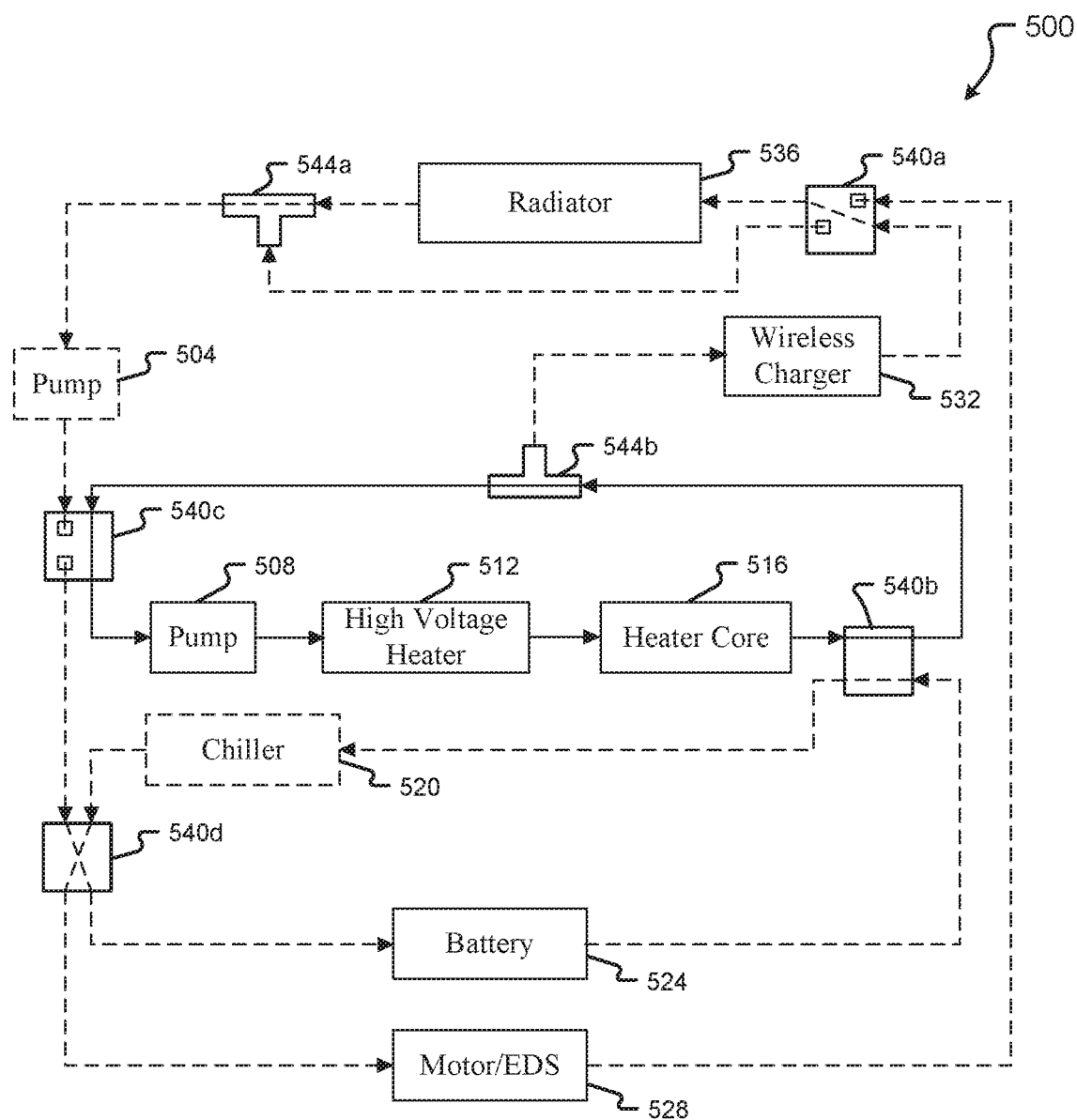
FIG. 13 is a diagram of the thermal management system of FIG. 5 in an eighth configuration in accordance with embodiments of the present disclosure.

FIG. 13 shows a configuration of the thermal management system 500 that is ideal for maximum heating of the cabin of the vehicle 100. The valves 540a and 540d are in a closed configuration, and the valves 540b and 540c are in a straight-through single path configuration. As a result, coolant flows through a short loop that includes the pump 508, the high voltage heater 512 (which heats the coolant), and the heater core 516 (where the hot coolant heats the cabin air). No coolant is routed to the battery 524, the motor/EDS 528, or the wireless charger 532.

In some embodiments, the valves 540a and 540d may be in any configuration other than a closed configuration, and the valves 540b and 540c may be in a straight-through configuration. However, because there is no pump creating a pressure differential along the flow paths shown in dotted lines in FIG. 13, there may be little or no flow through the valves 540a and 540d, and there may be little or no flow through one of the two flow paths through the valves 540b and 540c.

Figure 14:
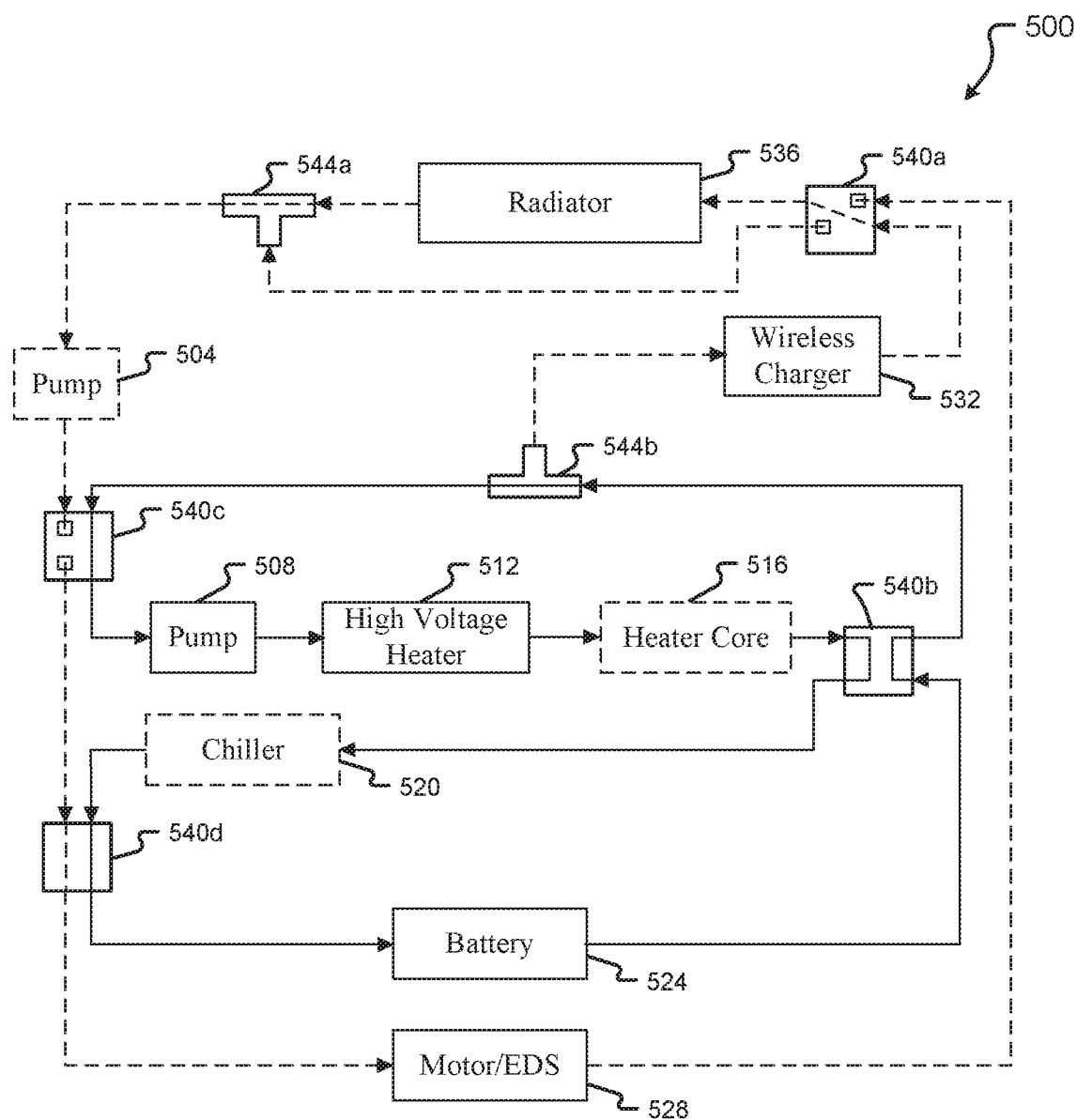
FIG. 14 is a diagram of the thermal management system of FIG. 5 in a ninth configuration in accordance with embodiments of the present disclosure.

Referring now to FIG. 14, in some scenarios, the battery 524 of the vehicle 100 must be preheated to a desired temperature range before the vehicle 100 is operable or for a period of time after the vehicle 100 is turned on. In such scenarios, the thermal management system 500 may be configured to achieve efficient preheating of the battery 524. More specifically, the valve 540a may be placed in a closed configuration, the valve 540b in a reverse configuration, and the valves 540c and 540d in a straight-through single path configuration. The resulting flow path includes the pump 508, the high voltage heater 512 (which heats the coolant), and the battery 524. No coolant is routed to the motor/EDS 528, the wireless charger 532, or the radiator 536. The pump 504, the heater core 516, and the chiller 520 are deactivated.

In some embodiments, the valve 540a may be placed in any configuration other than a closed configuration, and the valves 540c and 540d may be placed in a straight-through configuration. However, without a pump creating a pressure differential along the flow paths shown in dotted lines in FIG. 14, there may be little or no flow through the valve 540a or through one of the two flow paths through the valves 540c and 540d.

Figure 15:
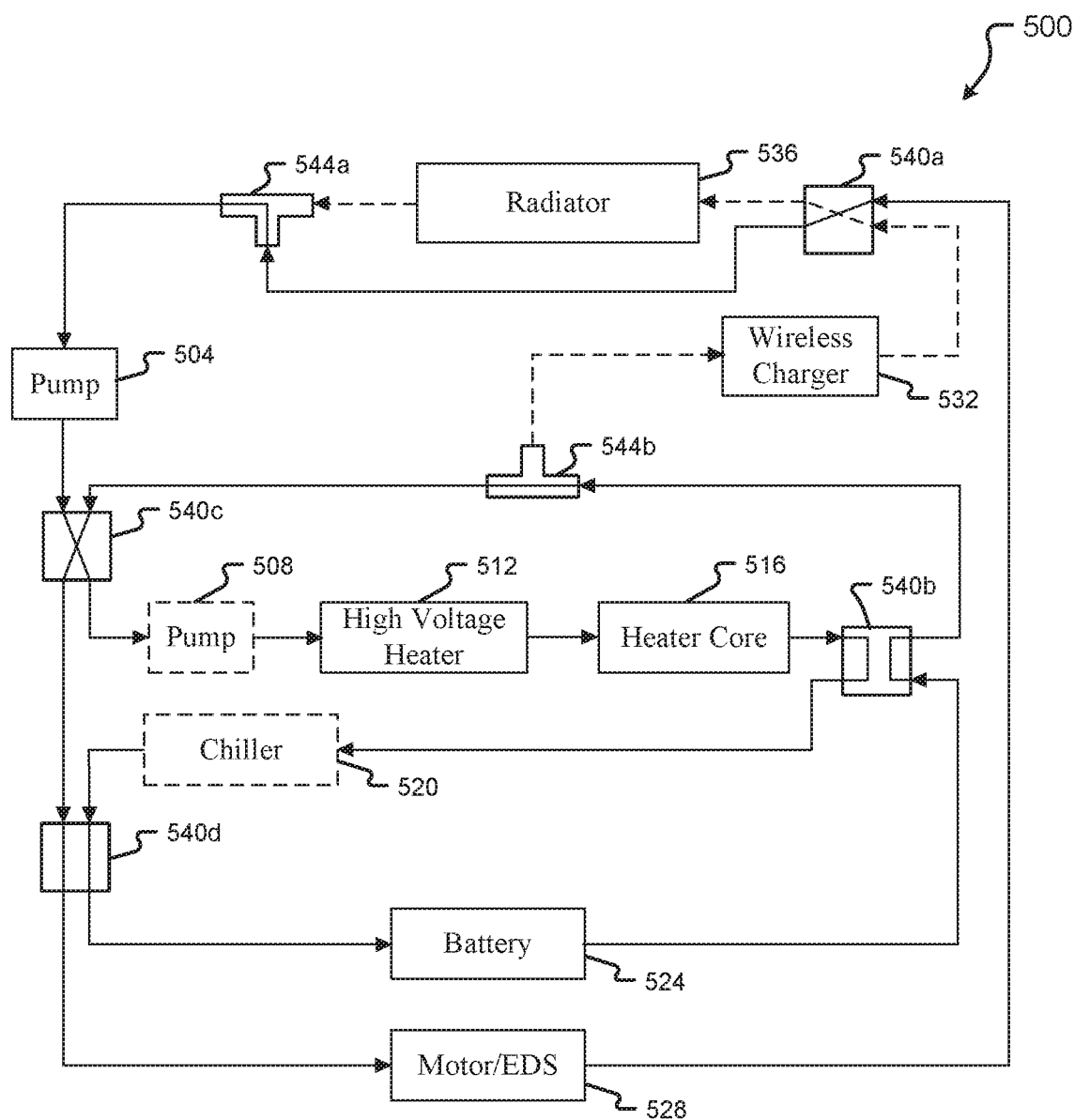
FIG. 15 is a diagram of the thermal management system of FIG. 5 in a tenth configuration in accordance with embodiments of the present disclosure.

Another configuration of the thermal management system 500 that is useful for heating the battery and cabin is illustrated in FIG. 15. In this configuration, the valve 540a is in a crossflow single path configuration, the valve 540b is in a reverse flow configuration, the valve 540c is in a crossflow configuration, and the valve 540d is in a straight-through configuration. The pump 508 is deactivated, as is the chiller 520. Moreover, because the purpose of this configuration is to heat the cabin of the vehicle 100 and the battery 524, the radiator 536 is bypassed. Coolant flows from the pump 504 to the high voltage heater 512 (which heats the coolant), then to the heater core 516 (which transfers heat from the coolant to the cabin air), and then to the battery 524 (where heat is transferred from the coolant to the battery 524). The coolant is then routed to the motor/EDS 528, which heats the coolant, before being routed back to the pump 504. This configuration of the thermal management system 500 therefore uses the motor/EDS 528 and the high voltage heater 512 to heat the coolant, which is then used to warm the cabin of the vehicle 100 as well as the battery 524.

In some embodiments, the valve 540a may be in a crossflow configuration, but without a pump creating a pressure differential along the flow path shown in dotted lines in FIG. 15, there may be little or no flow through one of the two flow paths through the valve 540a.

Figure 16:
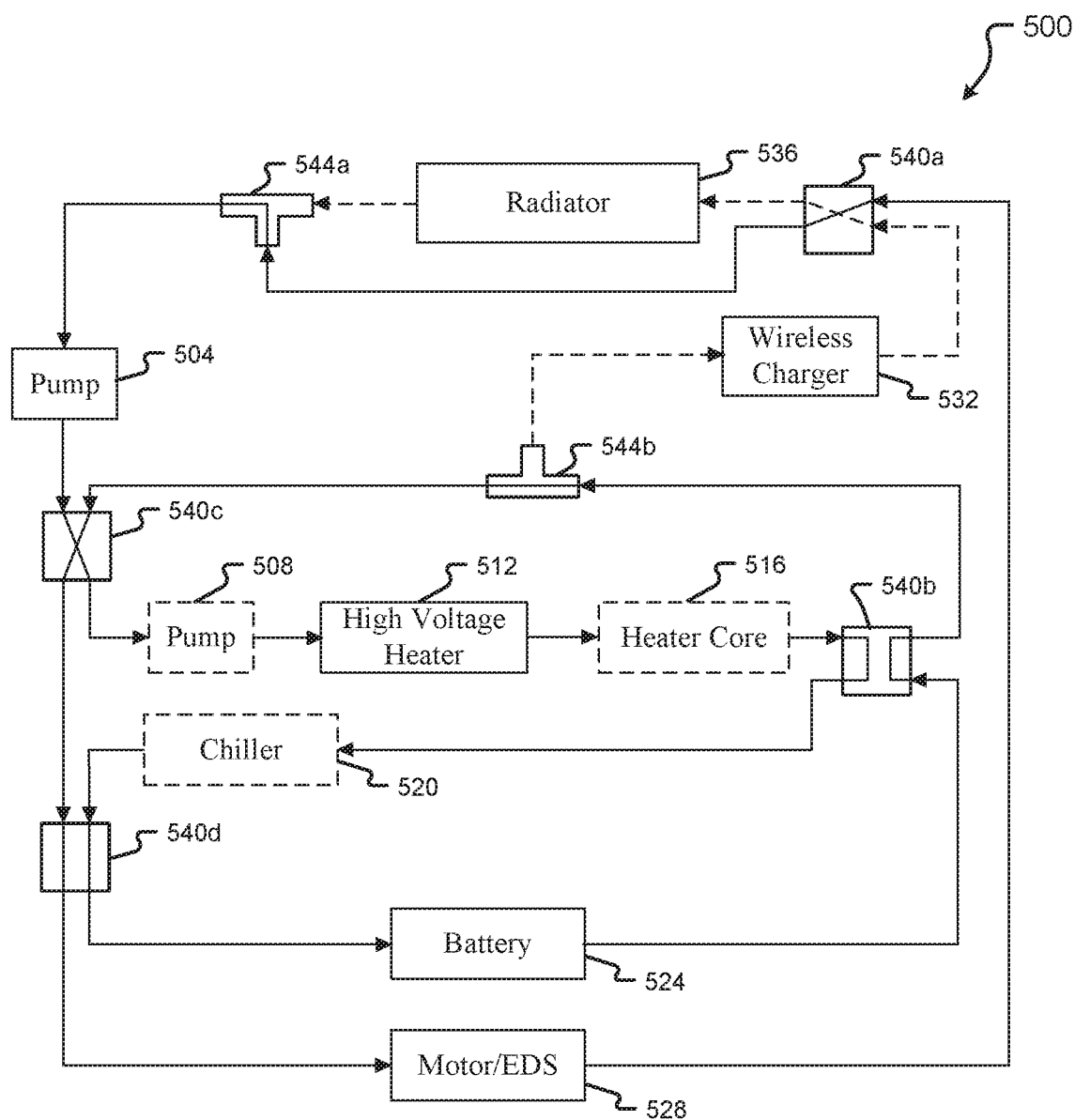
FIG. 16 is a diagram of the thermal management system of FIG. 5 in an eleventh configuration in accordance with embodiments of the present disclosure.

In the configuration of FIG. 16, the thermal management system 500 utilizes two-stage heating of the coolant, which then warms the battery 524. The valve 540a is placed in a crossflow single path configuration, the valve 540b in a reverse configuration, the valve 540c in a crossflow configuration, and the valve 540d in a straight-through configuration. The pump 508, heater core 516, and chiller 520 are all deactivated, and no coolant flows to the wireless charger 532 or radiator 536. Instead, coolant flows from the motor/EDS 528 (which heats the coolant) through the pump 504 and to the high voltage heater 512, which further heats the coolant. The hot coolant is then routed to and warms the battery 524 before flowing back to the motor/EDS 528.

In some embodiments, the valve 540a may be in a crossflow configuration, but without a pump creating a pressure differential along the flow path shown in dotted lines in FIG. 16, there may be little or no flow through one of the two flow paths through the valve 540a.

Figure 17:
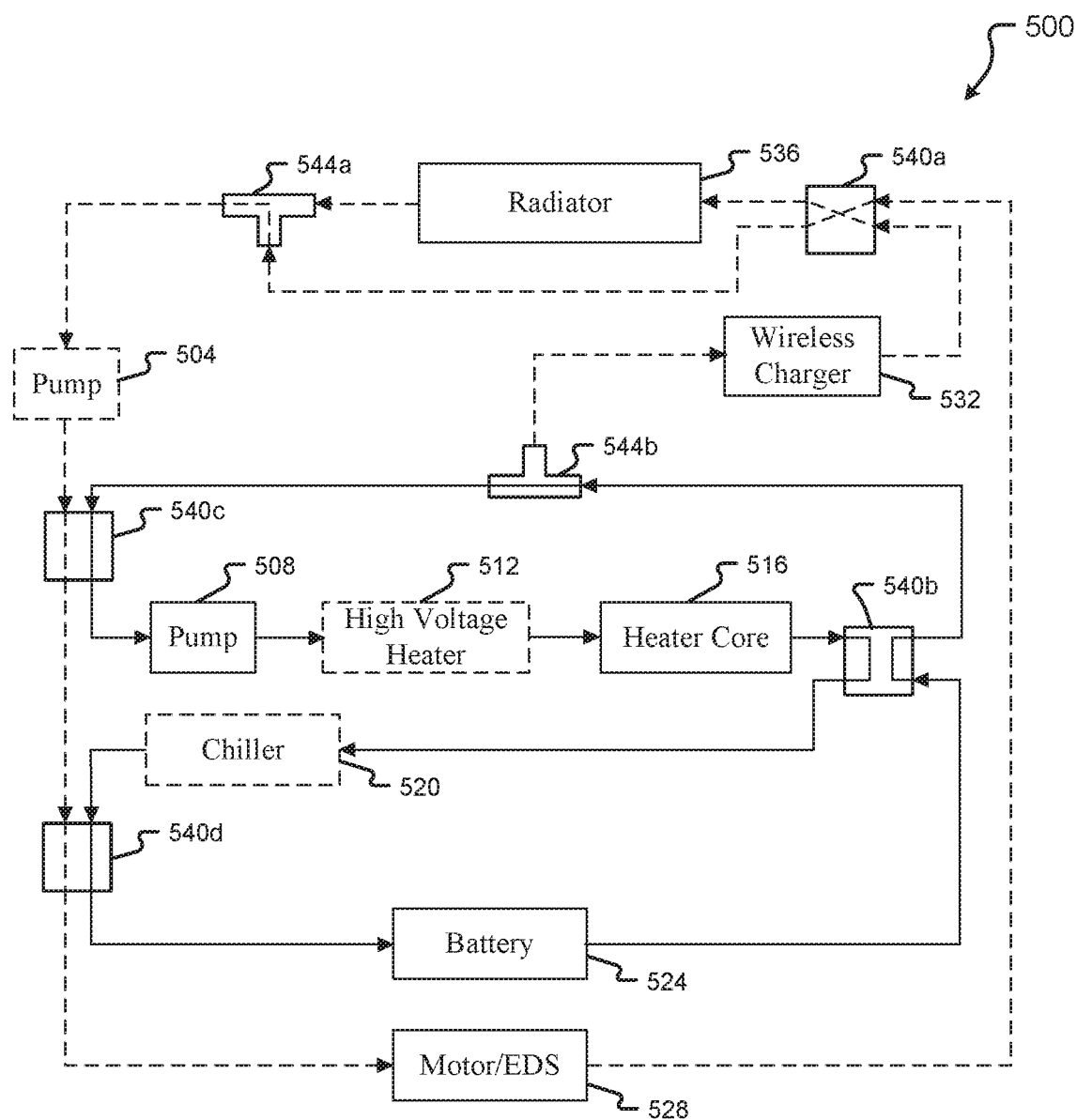
FIG. 17 is a diagram of the thermal management system of FIG. 5 in a twelfth configuration in accordance with embodiments of the present disclosure.

FIG. 17 shows yet another configuration of the thermal management system 500, which is useful for cooling the battery 524 during charging as well as pre-heating the cabin of the vehicle 100. The valve 540a is switched to a closed configuration; the valve 540b is switched to a reverse configuration; and the valves 540c and 540d are switched to a straight-through single path configuration. The pump 504 as well as the high voltage heater 512 and the chiller 520 are deactivated. With the pump 508 pressurizing the resulting coolant loop, coolant flows to the battery 524 (which heats the coolant) and then through the heater core 516 (where the heated coolant warms the cabin air). This configuration beneficially uses the waste heat from the charging of the battery 524 to warm the cabin, without using any energy to power the high voltage heater 512.

In some embodiments, the valve 540a may be placed in any configuration other than a closed configuration, and the valves 540c and 540d may be placed in a straight-through configuration. However, without a pump creating a pressure differential along the flow paths shown in dotted lines in FIG. 17, there may be little or no flow through the valve 540a or through one of the two flow paths through the valves 540c and 540d.

In some of FIGS. 6-17, one or more of the valves 504a, 504b, 504c, and 504d are shown with one flow path therethrough disconnected (e.g., valve 540a in FIG. 6), while in others of FIGS. 6-17, one or more of the valves 504a, 504b, 504c, and 504d are shown with both flow path extending through the valve, but with one or both of those flow paths appearing in a dotted line (e.g., element 540a in FIG. 10). Both of these graphical depictions indicate that little or no flow passes through the flow path in question. Such a lack of flow may be achieved by physically closing the flow path within the valve 504a, 504b, 504c, or 504d, and/or by configuring the thermal management system 500 so that no pump is operating to create a pressure differential along a path that includes the flow path in question.

Figure 18:
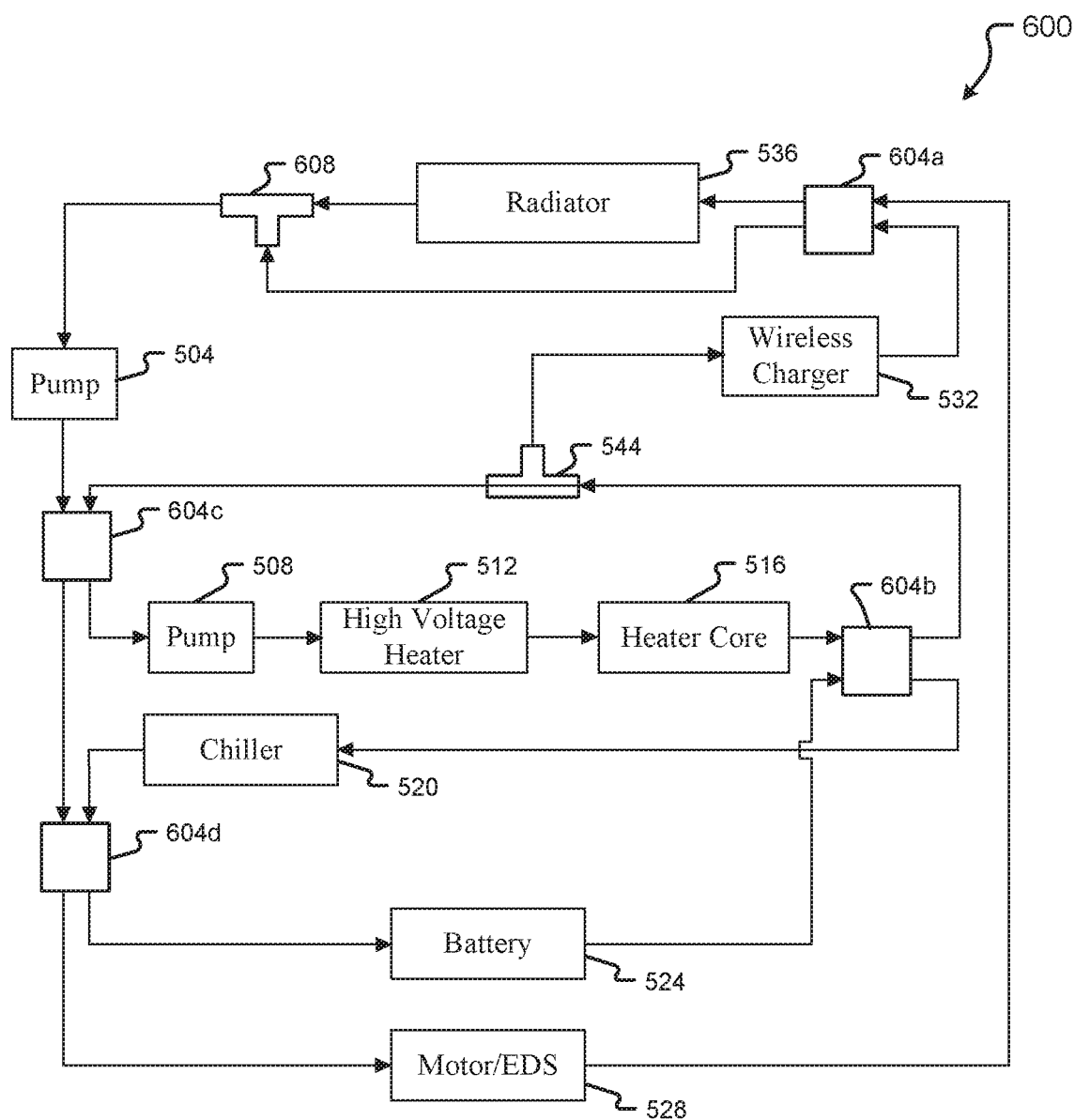
FIG. 18 is a diagram of another thermal management system in accordance with embodiments of the present disclosure.

Turning now to FIG. 18, a thermal management system 600 comprises many of the same elements as the thermal management system 500, including pumps 504 and 508, high voltage heater 512, heater core 516, chiller 520, battery 524, motor/EDS 528, wireless charger 532, radiator 536, and T-joint 544. Additionally, as with the thermal management system 500, the thermal management system 600 is arranged in three interconnectable loops. However, the thermal management system 600 also comprises several elements that are not present in the thermal management system 500 illustrated in FIGS. 5-17. Specifically, the thermal management system 600 does not require four-way valves of the variety described in U.S. patent application Ser. No. 15/802,651, or equivalent valves. Instead, the four-way valves 604a-d of the thermal management system 600 are standard four-way valves that switch between parallel flow and crossflow configurations.

Thus, the valves 604a-d need only accommodate inflow at two of the four ports on the valve, with the other two ports utilized solely for outflow. In some embodiments, two valves such as the valves 604a-d may be connected to each other to create an effective 6-way valve, which may then be used to provide additional interconnections between or among the loops of the thermal management system 600, and/or with other coolant or refrigerant loops.

In some embodiments, minor adjustments to the routing of coolant conduits connecting the various components of the thermal management system 600 (relative to the routing of coolant conduits connecting the various components of the thermal management system 500) may be necessary to accommodate the less-complex four-way valves 604a-d. In FIG. 18, for example, the conduit connecting the battery 524 and the valve 604b is connected to a different port of the valve 604b than the conduit connecting the battery 524 to the corresponding valve 540b in the thermal management system 500. Similarly, the conduit connecting the chiller 520 and the valve 604b is connected to a different port of the valve 604b than the conduit connecting the chiller 520 to the corresponding valve 540b in the thermal management system 500. The effect of this change is that while the valve 540b was capable of having, and configured to have, coolant flowing in opposite directions therethrough (as shown, for example, in FIG. 8), the valve 604b is configured to have coolant flowing in only one direction therethrough.

In addition to utilizing the simpler valves 604a-d instead of the more complex valves 540a-d, the thermal management system 600 utilizes a standard three-way valve 608 between the radiator 536 and the pump 504, instead of the T-joint 544a as used in the thermal management system 500. The three-way valve 608 can be configured to either channel flow received from the radiator 536 to the pump 504, or to channel flow received from the valve 604a to the pump 504.

Figure 19:
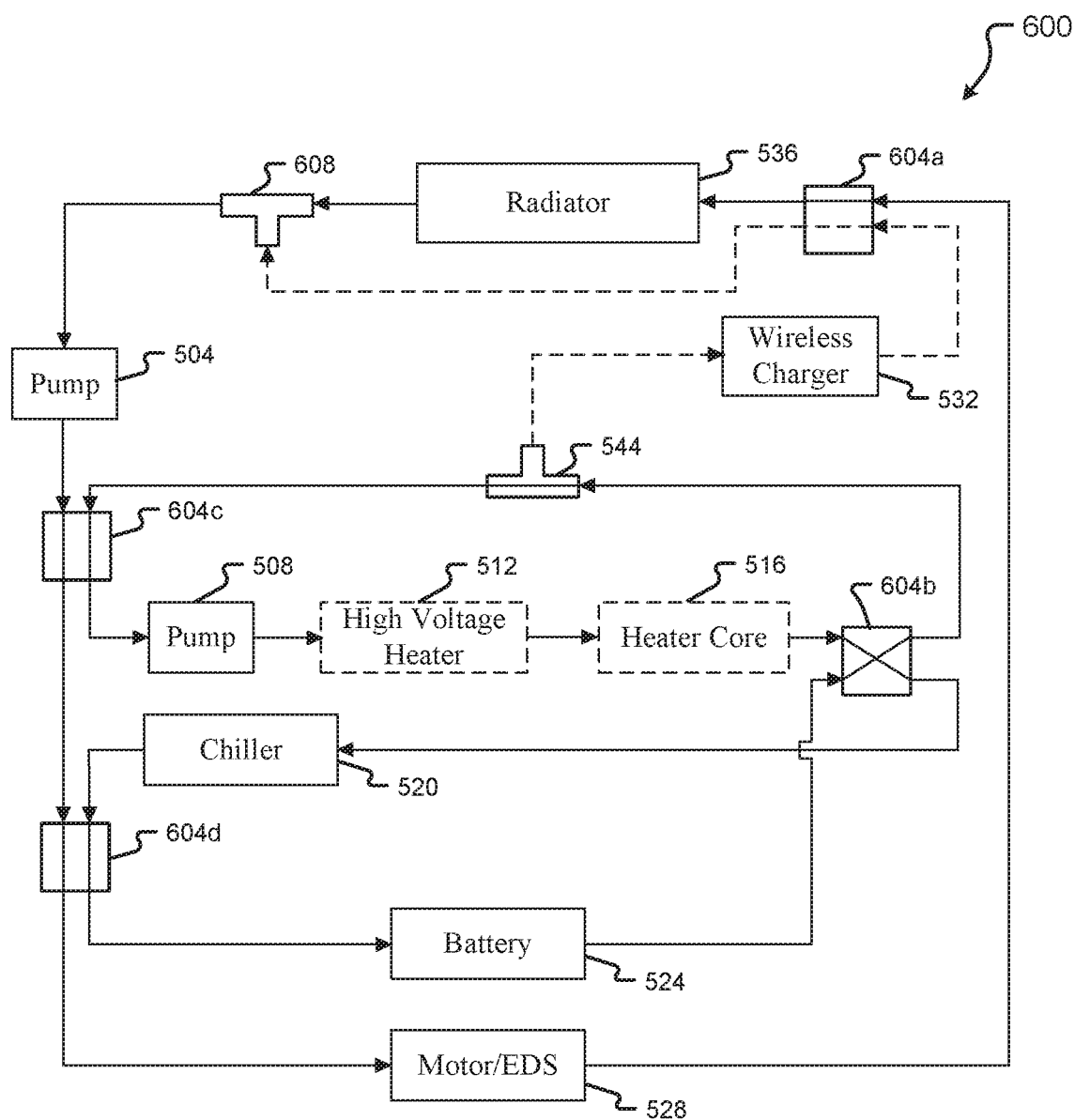
FIG. 19 is a diagram of the thermal management system of FIG. 18 in a first configuration in accordance with embodiments of the present disclosure.

The thermal management system 600 is capable of operation in many of the same modes as the thermal management system 500. For example, FIG. 19 shows the thermal management system 600 in a maximum cooling mode that replicates the maximum cooling mode of the thermal management system 500 as shown in FIG. 6. In this mode the valve 604b is placed in a crossflow configuration (whereas the corresponding valve 540b of FIG. 7 is placed in a reverse configuration), and the valves 604a, 604c, and 604d are placed in a parallel configuration. The three-way valve 608 is arranged to channel coolant from the radiator 536 to the pump 504, such that the flow of coolant from the T-joint 544 to the wireless charger 532 and the valve 604a is stopped (e.g., no cooling of the wireless charger 532 by the thermal management system 600 takes place in this mode).

The remaining components of the thermal management system 600 are placed in the same configuration as the corresponding component of the thermal management system 500 as shown in FIG. 6. Thus, each pump 504, 508 circulates coolant around a separate loop, one for cooling the motor/EDS 528 and the other for cooling the battery 524. Neither the high voltage heater 512 nor the heater core 516 is operational. Also in this configuration, the pump 504 circulates coolant through the four-way valves 604c and 604d, both of which are in a straight-through configuration, to the motor/EDS 528, where the coolant extracts heat from, and thus cools, the motor/EDS 528. The heated coolant then flows through the valve 604a, which is in a straight-through single path configuration, to the radiator 536, where the coolant exchanges heat with outside air, thus reducing the temperature of the coolant. The cooled coolant is then channeled through the three-way valve 608 and back to the pump 504.

Also in the configuration of FIG. 19, the pump 508 circulates coolant to the chiller 520 via the nonoperational high voltage heater 512, the nonoperational heater core 516, and the four-way valve 604b (which, as mentioned above, is in a crossflow configuration). The chilled coolant exiting the chiller 520 is routed through the four-way valve 604d to the battery 524, then back to the pump 508 via the four-way valve 604b, the T-joint 544, and the four-way valve 604c.

The maximum cooling mode of FIG. 7 may also be replicated using the thermal management system 600. This may be accomplished by placing the valve 604a in a parallel configuration and valves 604b, 604c, and 604d in a crossflow configuration, configuring the three-way valve 608 to channel coolant from the radiator 536 to the pump 504 (with the third port of the valve 608 closed), and placing each of the remaining components of the thermal management system 600 in the same configuration as the corresponding component of the thermal management system 500 as shown in FIG. 7.

Similarly, the cabin and battery heating mode of FIG. 8 may be replicated using the thermal management system 600, by placing the valves 604a, 604c, and 604d in a crossflow configuration and the valve 604b in a parallel configuration, configuring the three-way valve 608 to channel coolant from the valve 604a toward the pump 504 (such that no coolant flows through the radiator 536), and otherwise placing each of the remaining components of the thermal management system 600 in the same configuration as the corresponding component of the thermal management system 500 as shown in FIG. 8.

The two-stage cooling mode of FIG. 9 may be replicated using the thermal management system 600 by placing the valves 604a and 604d in a parallel configuration and the valves 604b and 604c in a crossflow configuration, and configuring the three-way valve 608 to channel coolant from the radiator 536 toward the pump 504 (with the third port of the three-way valve 608, connected to the radiator bypass conduit, closed). Each of the remaining components of the thermal management system 600 are placed in the same configuration as the corresponding component of the thermal management system 500 as shown in FIG. 9.

The fast charging mode of FIG. 10 (e.g., for cooling the battery 524 during fast charging thereof, while the vehicle 100 is stopped) may be replicated using the thermal management system 600 by placing the valves 604a and 604d in either the parallel or crossflow configuration, the valve 604b in a crossflow configuration, and the valve 604c in a parallel configuration; leaving the three-way valve 608 in either configuration; and placing each of the remaining components of the thermal management system 600 in the same configuration as the corresponding component of the thermal management system 500 as shown in FIG. 10.

The wireless charging mode of FIG. 11 (e.g., for cooling the wireless charger 532) may be replicated using the thermal management system 600 by placing the valve 604a in the parallel configuration, valves 604b and 604c in the crossflow configuration, and valve 604d in either the parallel or crossflow configuration; and configuring the three-way valve 608 to channel coolant from the radiator bypass conduit (which directly connects the valve 604a to the valve 608) toward the pump 504, with the remaining port of the three-way valve 608 closed. Each of the remaining components of the thermal management system 600 is placed in the same configuration as the corresponding components of the thermal management system 500 as shown in FIG. 11.

The alternative wireless charging mode of FIG. 12 may be replicated using the thermal management system 600 by placing the valves 604a and 604c in a crossflow configuration, the valve 604 in a parallel configuration, and the valve 604c in a crossflow single path configuration; and configuring the valve 608 to channel coolant from the radiator 536 toward the pump 504, with the port connected to the radiator bypass conduit closed. Each of the remaining components of the thermal management system 600 is placed in the same configuration as the corresponding components of the thermal management system 500 as shown in FIG. 12.

The cabin heating mode of FIG. 13 may be replicated using the thermal management system 600 by placing the valve 604b in a parallel configuration (with the remaining valves 604a, 604c, and 604d in either the crossflow or parallel configurations), leaving the valve 608 in either configuration, and placing each of the remaining components of the thermal management system 600 in the same configuration as the corresponding components of the thermal management system 500 as shown in FIG. 13.

The battery preheat mode of FIG. 14 may be replicated using the thermal management system 600 by placing the valve 604b in a crossflow configuration and the valve 604d in a parallel configuration (with the remaining valves 604a and 604c in either a parallel or crossflow configuration), and leaving the valve 608 in either configuration. Each of the remaining components of the thermal management system 600 is placed in the same configuration as the corresponding components of the thermal management system 500 as shown in FIG. 14.

The maximum battery and cabin heating mode of FIG. 15 may be replicated using the thermal management system 600 by placing the valves 604a, 604b, and 604c in the crossflow configuration and the valve 604d in the parallel configuration; and configuring the valve 608 to channel coolant from the radiator bypass conduit toward the pump 504 (with the port connected to the conduit that channels coolant from the radiator 536 to the valve 608 closed). Each of the remaining components of the thermal management system 600 is placed in the same configuration as the corresponding components of the thermal management system 500 as shown in FIG. 15.

The fast charging and cabin preheat mode of FIG. 17 may be replicated using the thermal management system 600 by placing the valve 604b in the crossflow configuration and the valve 604c in the parallel configuration (with the valves 604a and 604d in either the parallel or the crossflow configuration), and leaving the valve 608 in either configuration. Each of the remaining components of the thermal management system 600 is placed in the same configuration as the corresponding components of the thermal management system 500 as shown in FIG. 17.

As may be appreciated given the foregoing description and accompanying drawings, many of the operational modes of thermal management systems of the present disclosure utilize only one pump. The inclusion of two pumps in such systems, then, allows for enhanced operation when both pumps are utilized, but also enables the thermal management systems of the present disclosure to continue to operate in numerous modes even if one of the two pumps fails. At the same time, thermal management systems of the present disclosure may in some embodiments have no more than two pumps, because the system can be safely operated, with sufficient redundancy, with only two pumps.

Additionally, the present disclosure encompasses thermal management systems that comprise additional elements beyond those described herein, including both additional elements to be heated and/or cooled, as well as additional elements for heating and/or cooling the coolant flowing through the system.

Any of the foregoing thermal management system embodiments may utilize water as the coolant thereof. In some embodiments, other coolants may be used, including water-chemical mixtures (e.g., water mixed with ethylene glycol), glycol-based fluids without water, A number of variations and modifications of the disclosure can be used. It would be possible to provide for some features of the disclosure without providing others.

In some embodiments, one or more aspects of the present disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing one or more aspects of the present disclosure illustrated herein can be used to implement the one or more aspects of this disclosure.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by the use of such language as "for example," "such as," "by way of example," "e.g.," and other language commonly understood to indicate that what follows is an example.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments of the present disclosure include a thermal management system comprising: a first coolant loop comprising a first pump and a radiator and configured to route coolant to at least one electrical drivetrain system component; a second coolant loop separate from the first coolant loop and comprising a second pump, a high voltage heater, and a heater core; and a third coolant loop separate from first and second coolant loops, the third coolant loop comprising a chiller and configured to route coolant to a battery; wherein the first loop is interconnectable with the second loop via a first four-way valve, the second loop is interconnectable with the third loop via a second four-way valve separate from the first four-way valve, and the first loop is interconnectable with the third loop via a third four-way valve separate from the first and second four-way valves.

Aspects of the above thermal management system include: a coolant conduit configured to route coolant from the second coolant loop to a wireless charger, and from the wireless charger to a fourth four-way valve separate from the first, second, and third four-way valves; wherein the first coolant loop comprises the fourth four-way valve; wherein the coolant is water; wherein the first coolant loop comprises a radiator bypass conduit that enables coolant to flow around the radiator; wherein the first loop comprises a three-way valve selectively configurable to receive coolant from the radiator or to receive coolant from the radiator bypass conduit; wherein the second four-way valve is configured to route coolant from the second coolant loop into the third coolant loop, and to route coolant from the third coolant loop into the first coolant loop; wherein the first four-way valve is configured to route coolant from second coolant loop to the first coolant loop, and to route coolant from the first coolant loop into the second coolant loop; wherein the third four-way valve is configured to route coolant from the first coolant loop to the third coolant loop, and to route coolant from the third coolant loop into the first coolant loop; and wherein each of the first pump, the second pump, the high voltage heater, the heater core, and the chiller can be selectively activated.

Embodiments of the present disclosure also include an electric vehicle comprising: a battery; an electrical drivetrain system comprising at least one motor, the electrical drivetrain system powered by the battery; a wireless charger for charging the battery; and a thermal management system, the thermal management system comprising: a first coolant loop comprising a first pump, a first four-way valve, a second four-way valve, and a radiator, the first coolant loop configured to route coolant to at least a portion of the electrical drivetrain system; a second coolant loop comprising a second pump, a high voltage heater, a heater core, the first four-way valve, and a third four-way valve; and a third coolant loop comprising a chiller and the second four-way valve, the third coolant loop configured to route coolant to the battery.

Aspects of the above electric vehicle include any of the aspects of the thermal management system described above, as well as: wherein the first four-way valve is selectively configurable to route coolant from the first coolant loop to second coolant loop, and from the second coolant loop to the first coolant loop; wherein the second four-way valve is selectively configurable to route coolant from the first coolant loop to the third coolant loop, and from the third coolant loop to the first coolant loop; wherein the third four-way valve is selectively configurable to route coolant from the second coolant loop to the third coolant loop, and from the third coolant loop to the second coolant loop; wherein each of the first pump and the second pump can be selectively deactivated; the first coolant loop further comprising a fourth four-way valve, and the thermal management system further comprising a coolant conduit for routing fluid from the second coolant loop to the wireless charger, and from the wireless charger to the fourth four-way valve; wherein the battery heats coolant in the third coolant loop and the heated coolant is routed to the heater core for heating air flowing therethrough; wherein the electrical drivetrain system heats coolant in the first loop and the heated coolant is routed to the battery for heating the battery; and wherein coolant is routed to the radiator for first stage cooling and to the chiller for second stage cooling before being routed to one of the battery and the electrical drivetrain system.

Embodiments of the present disclosure further include a system for managing thermal energy in a vehicle, comprising: a first coolant loop comprising a first pump and a radiator, the first coolant loop configured to extract heat from at least a portion of an electrical drivetrain system, the first pump selectively operable; a second coolant loop comprising a second pump, a high voltage heater, and a heater core, each of the second pump, the high voltage heater, and the heater core selectively operable; a third coolant loop comprising a selectively operable chiller, the third coolant loop configurable to route coolant to a battery; wherein the first coolant loop is selectively interconnectable with each of the second coolant loop and the third coolant loop, and the second coolant loop is selectively interconnectable with the third coolant loop.

Aspects of the above system for managing thermal energy in a vehicle include any of the aspects of the thermal management system and of the electric vehicle listed above.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with onboard rechargeable energy storage, including electric vehicles and hybrid electric vehicles.

Examples of processors as referenced herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, and ARM® Cortex-A and ARIVI926EJS™ processors. A processor as disclosed herein may perform computational functions using any known or future-developed standard, instruction set, libraries, and/or architecture.

What is claimed is:

1. A thermal management system comprising: a first coolant loop comprising a first pump and a radiator and configured to route coolant to at least one electrical drivetrain system component; a second coolant loop separate from the first coolant loop and comprising a second pump, a high voltage heater, and a heater core, the second coolant loop interconnectable with the first coolant loop via a first four-way valve; a third coolant loop separate from the first and second coolant loops, the third coolant loop comprising a chiller and configured to route coolant to a battery, the third coolant loop interconnectable with the second coolant loop via a second four-way valve separate from the first four-way valve, and interconnectable with the first coolant loop via a third four-way valve separate from the first and second four-way valves; and a coolant conduit configured to route coolant from the second coolant loop to a wireless charger, and from the wireless charger to a fourth four-way valve separate from the first, second, and third four-way valves.

2. The thermal management system of claim 1, wherein the chiller utilizes a refrigerant separate from the coolant as a working fluid.

3. The thermal management system of claim 1, wherein the first coolant loop comprises the fourth four-way valve.

4. The thermal management system of claim 1, wherein the coolant is water.

5. The thermal management system of claim 1, wherein the first coolant loop comprises a radiator bypass conduit that enables coolant to flow around the radiator.

6. The thermal management system of claim 5, wherein the first coolant loop comprises a three-way valve selectively configurable to receive coolant from the radiator or to receive coolant from the radiator bypass conduit.

7. The thermal management system of claim 1, wherein the second four-way valve is configured to route coolant from the second coolant loop into the third coolant loop, and to route coolant from the third coolant loop into the first coolant loop.

8. The thermal management system of claim 1, wherein the first four-way valve is configured to route coolant from the second coolant loop to the first coolant loop, and to route coolant from the first coolant loop into the second coolant loop.

9. The thermal management system of claim 1, wherein the third four-way valve is configured to route coolant from the first coolant loop to the third coolant loop, and to route coolant from the third coolant loop into the first coolant loop.

10. The thermal management system of claim 1, wherein each of the first pump, the second pump, the high voltage heater, the heater core, and the chiller can be selectively activated.

11. An electric vehicle comprising:
a battery;
an electrical drivetrain system comprising at least one motor, the electrical drivetrain system powered by the battery;
a wireless charger for charging the battery; and
a thermal management system, the thermal management system comprising:
a first coolant loop comprising a first pump, a first four-way valve, a second four-way valve, and a radiator, the first coolant loop configured to route coolant to at least a portion of the electrical drivetrain system;
a second coolant loop comprising a second pump, a high voltage heater, a heater core, the first four-way valve, and a third four-way valve; and
a third coolant loop comprising a chiller and the second four-way valve, the third coolant loop configured to route coolant to the battery.

12. The electric vehicle of claim 11, wherein the first four-way valve is selectively configurable to route coolant from the first coolant loop to the second coolant loop, and from the second coolant loop to the first coolant loop.

13. The electric vehicle of claim 11, wherein the second four-way valve is selectively configurable to route coolant from the first coolant loop to the third coolant loop, and from the third coolant loop to the first coolant loop.

14. The electric vehicle of claim 11, wherein the third four-way valve is selectively configurable to route coolant from the second coolant loop to the third coolant loop, and from the third coolant loop to the second coolant loop.

15. The electric vehicle of claim 11, wherein each of the first pump and the second pump can be selectively deactivated.

16. The electric vehicle of claim 11, the first coolant loop further comprising a fourth four-way valve, and the thermal management system further comprising a coolant conduit for routing fluid from the second coolant loop to the wireless charger, and from the wireless charger to the fourth four-way valve.

17. The electric vehicle of claim 11, wherein the battery heats coolant in the third coolant loop and the heated coolant is routed to the heater core for heating air flowing therethrough.

18. The electric vehicle of claim 11, wherein the electrical drivetrain system heats coolant in the first coolant loop and the heated coolant is routed to the battery for heating the battery.

19. The electric vehicle of claim 11, wherein coolant is routed to the radiator for first stage cooling and to the chiller for second stage cooling before being routed to one of the battery and the electrical drivetrain system.

20. A system for managing thermal energy in a vehicle, comprising:
- a first coolant loop comprising a first pump and a radiator, the first coolant loop configured to extract heat from at least a portion of an electrical drivetrain system, the first pump being selectively operable;
- a second coolant loop comprising a second pump, a high voltage heater, and a heater core, each of the second pump, the high voltage heater, and the heater core being selectively operable, the second coolant loop interconnectable with the first coolant loop via a first four-way valve;
- a third coolant loop comprising a selectively operable chiller, the third coolant loop configurable to route coolant to a battery and interconnectable with the first coolant loop via a second four-way valve different than the first four-way valve, and with the second coolant loop via a third four-way valve different than the first and second four-way valves; and
- a coolant conduit configured to route coolant from the second coolant loop to a wireless charger, and from the wireless charger to a fourth four-way valve different than the first, second, and third four-way valves.

\* \* \* \* \*